US010318111B2

(12) United States Patent
Vandermolen et al.

(10) Patent No.: US 10,318,111 B2
(45) Date of Patent: Jun. 11, 2019

(54) IDENTIFICATION OF ELECTRONIC CONTENT SIGNIFICANT TO A USER

(71) Applicant: Facebook, Inc., Menlo Park, CA (US)

(72) Inventors: Harmannus Vandermolen, Sunnyvale, CA (US); Charles Fish, New Hope, PA (US); Karen Howe, Sammamish, WA (US); Paul Vidich, New York, NY (US); Scott J. Levine, Arlington, VA (US)

(73) Assignee: FACEBOOK, INC., Menlo Park, CA (US)

( * ) Notice: Subject to any disclaimer, the term of this patent is extended or adjusted under 35 U.S.C. 154(b) by 327 days.

(21) Appl. No.: 15/132,913

(22) Filed: Apr. 19, 2016

(65) Prior Publication Data

US 2016/0231891 A1 Aug. 11, 2016

Related U.S. Application Data

(63) Continuation of application No. 13/836,663, filed on Mar. 15, 2013, now Pat. No. 9,384,194, which is a
(Continued)

(51) Int. Cl.

| G06F 3/0482 | (2013.01) |
| G06F 16/22 | (2019.01) |
| G06F 16/93 | (2019.01) |
| G06F 16/951 | (2019.01) |
| G06F 16/9535 | (2019.01) |

(Continued)

(52) U.S. Cl.
CPC .......... *G06F 3/0482* (2013.01); *G06F 3/0481* (2013.01); *G06F 3/04842* (2013.01); *G06F 16/22* (2019.01); *G06F 16/93* (2019.01); *G06F 16/951* (2019.01); *G06F 16/9535* (2019.01); *H04L 67/02* (2013.01)

(58) Field of Classification Search
CPC .................. G06F 17/30867; G06F 3/0482
USPC ........................................ 715/738
See application file for complete search history.

(56) References Cited

U.S. PATENT DOCUMENTS

| 5,751,286 A | 5/1998 | Barber et al. |
| 5,828,839 A | 10/1998 | Moncreiff |

(Continued)

FOREIGN PATENT DOCUMENTS

WO WO 2004095314 11/2004

OTHER PUBLICATIONS

Baker, L., "Blinkx.TV: More Video Than Google, Yahoo or YouTube", Search Engine Journal, Jun. 14, 2006, pp. 1-7, http://www.searchenginjournal.com/blinkxtv-more-video-than-google-yahoo-or-myspace/3532/ (Visited Mar. 5, 2008).
(Continued)

*Primary Examiner* — William D Titcomb
(74) *Attorney, Agent, or Firm* — Keller Jolley Preece

(57) ABSTRACT

Content that is significant to a user may be determined. An indication that a user finds content within a document significant may be received. In response to the received indication, the document may be analyzed to identify a set of topics associated with the content of the document. From the set of topics, a subset of topics responsible for the user finding the document significant may be identified. A user profile associated with the user may be updated based on the subset of topics.

20 Claims, 14 Drawing Sheets

Related U.S. Application Data continuation of application No. 13/834,716, filed on Mar. 15, 2013, now abandoned, which is a continuation of application No. 12/839,767, filed on Jul. 20, 2010, said application No. 13/836,663 is a continuation of application No. 12/839,767, filed on Jul. 20, 2010, which is a continuation of application No. 11/538,383, filed on Oct. 3, 2006, now Pat. No. 7,783,622.

(60) Provisional application No. 60/820,879, filed on Jul. 31, 2006, provisional application No. 60/820,033, filed on Jul. 21, 2006.

(51) Int. Cl.
  *G06F 3/0481* (2013.01)
  *G06F 3/0484* (2013.01)
  *H04L 29/08* (2006.01)

(56) References Cited

U.S. PATENT DOCUMENTS

| | | |
|---|---|---|
| 5,835,087 A | 11/1998 | Herz et al. |
| 6,049,806 A | 4/2000 | Crecine |
| 6,112,203 A | 8/2000 | Bharat et al. |
| 6,385,602 B1 | 5/2002 | Tso et al. |
| 6,490,603 B1 | 12/2002 | Keenan et al. |
| 6,493,688 B1 | 12/2002 | Das et al. |
| 6,611,842 B1 | 8/2003 | Brown |
| 6,681,370 B2 | 1/2004 | Gounares et al. |
| 6,691,106 B1 | 2/2004 | Sathyanarayan |
| 6,732,090 B2 | 5/2004 | Shanahan et al. |
| 6,823,370 B1 | 11/2004 | Kredo et al. |
| 6,901,207 B1 | 5/2005 | Watkins |
| 7,028,253 B1 | 4/2006 | Lieberman et al. |
| 7,053,938 B1 | 5/2006 | Sherry |
| 7,209,942 B1 | 4/2007 | Hori et al. |
| 7,281,220 B1 | 10/2007 | Rashovskiy |
| 7,367,043 B2 | 4/2008 | Dudkiewicz et al. |
| 7,440,976 B2 | 10/2008 | Hart et al. |
| 7,783,622 B1* | 8/2010 | Vandermolen .... G06F 17/30867 707/708 |
| 7,836,051 B1 | 11/2010 | Mason |
| 8,042,063 B1 | 10/2011 | Lin-Hendel |
| 8,065,383 B2* | 11/2011 | Carlson .......... G06Q 30/06 709/217 |
| 8,078,615 B2* | 12/2011 | Smith ............ G06F 17/30867 707/732 |
| 8,745,226 B2* | 6/2014 | Harinstein ........ G06Q 30/02 707/706 |
| 8,799,070 B1 | 8/2014 | Sheinfeld et al. |
| 8,856,030 B2* | 10/2014 | Russek .......... G06F 17/30265 705/14.66 |
| 8,930,358 B2* | 1/2015 | Zito ............. G06F 17/30035 707/734 |
| 8,990,678 B2* | 3/2015 | Bedingfield, Sr. ........................ G06F 17/3089 707/E17.116 |
| 8,996,536 B2* | 3/2015 | Crosa .......... G06F 17/30867 707/748 |
| 9,508,099 B2* | 11/2016 | Cancro .......... G06Q 30/0641 |
| 2002/0069218 A1 | 6/2002 | Sull et al. |
| 2002/0116363 A1 | 8/2002 | Grainger |
| 2002/0133826 A1 | 9/2002 | Ohyama |
| 2002/0178146 A1 | 11/2002 | Akella et al. |
| 2002/0184336 A1 | 12/2002 | Rising |
| 2002/0188603 A1 | 12/2002 | Baird et al. |
| 2002/0194300 A1 | 12/2002 | Lin et al. |
| 2002/0198859 A1 | 12/2002 | Singer et al. |
| 2003/0033287 A1 | 2/2003 | Shanahan et al. |
| 2003/0055720 A1 | 3/2003 | Overton et al. |
| 2003/0093790 A1 | 5/2003 | Logan et al. |
| 2003/0182220 A1 | 9/2003 | Galant |
| 2003/0195884 A1* | 10/2003 | Boyd ............ G06F 17/30867 |
| 2003/0235407 A1 | 12/2003 | Lord |
| 2004/0002976 A1 | 1/2004 | Lucovsky |
| 2004/0098754 A1 | 5/2004 | Vella et al. |
| 2004/0114571 A1 | 6/2004 | Timmins et al. |
| 2004/0205514 A1 | 10/2004 | Sommerer et al. |
| 2004/0225519 A1 | 11/2004 | Martin |
| 2005/0021677 A1* | 1/2005 | Musha ............ G06F 17/30663 709/218 |
| 2005/0044496 A1 | 2/2005 | Kotler et al. |
| 2005/0055420 A1 | 3/2005 | Wyler |
| 2005/0071479 A1 | 3/2005 | Achlioptas |
| 2005/0076093 A1* | 4/2005 | Michelitsch ...... G06F 17/30867 709/217 |
| 2005/0091694 A1 | 4/2005 | Rambo |
| 2005/0114324 A1 | 5/2005 | Mayer |
| 2005/0114449 A1 | 5/2005 | Verhaeghe et al. |
| 2005/0128361 A1 | 6/2005 | Li et al. |
| 2005/0144086 A1 | 6/2005 | Speiser et al. |
| 2006/0026147 A1 | 2/2006 | Cone et al. |
| 2006/0048046 A1 | 3/2006 | Joshi et al. |
| 2006/0059134 A1 | 3/2006 | Palmon et al. |
| 2006/0069674 A1 | 3/2006 | Palmon et al. |
| 2006/0069699 A1 | 3/2006 | Smadja et al. |
| 2006/0071950 A1 | 4/2006 | Kurzweil et al. |
| 2006/0167857 A1 | 7/2006 | Kraft et al. |
| 2006/0167864 A1 | 7/2006 | Bailey et al. |
| 2006/0179051 A1 | 8/2006 | Whitney et al. |
| 2006/0218573 A1 | 9/2006 | Proebstel |
| 2006/0224552 A1 | 10/2006 | Riezler et al. |
| 2007/0005564 A1 | 1/2007 | Zehner |
| 2007/0055926 A1 | 3/2007 | Christiansen et al. |
| 2007/0067157 A1 | 3/2007 | Kaku et al. |
| 2007/0067317 A1 | 3/2007 | Stevenson |
| 2007/0088603 A1 | 4/2007 | Jouppi et al. |
| 2007/0094247 A1 | 4/2007 | Chowdhury et al. |
| 2007/0101297 A1 | 5/2007 | Forstall et al. |
| 2007/0112817 A1 | 5/2007 | Danniger |
| 2007/0130563 A1 | 6/2007 | Elgazzar et al. |
| 2007/0156677 A1 | 7/2007 | Szabo |
| 2007/0208719 A1 | 9/2007 | Tran |
| 2007/0226183 A1 | 9/2007 | Hart et al. |
| 2007/0261099 A1 | 11/2007 | Broussard et al. |
| 2007/0300258 A1 | 12/2007 | O'Connor et al. |
| 2008/0005118 A1 | 1/2008 | Shakib et al. |
| 2008/0155627 A1 | 6/2008 | O'Connor et al. |
| 2009/0037388 A1* | 2/2009 | Cooper ............ G06Q 10/10 |
| 2013/0007596 A1 | 1/2013 | Vandermolen |
| 2013/0080430 A1 | 3/2013 | Vandermolen |
| 2013/0204873 A1 | 8/2013 | Vandermolen |
| 2013/0205231 A1 | 8/2013 | Vandermolen |
| 2013/0205232 A1 | 8/2013 | Vandermolen |
| 2014/0019542 A1* | 1/2014 | Rao ............. H04L 67/306 709/204 |
| 2014/0214619 A1* | 7/2014 | Cancro .......... G06Q 30/0641 705/26.61 |
| 2015/0106727 A1* | 4/2015 | Boulter .......... G06F 17/30761 715/739 |

OTHER PUBLICATIONS

Gizmodo, http://gizmodo.com/gadgets/home-enterntainment/tivo-sends-cease-and-desist-to-smugmug-for-their-thumbs-u . . . , Jun. 12, 2006, pp. 1-2. (Visited Mar. 5, 2008).

International Search Report issued in International Application No. PCT/US07/73999, dated Jul. 7, 2008, 8 pages.

Agichtein et al., Improving Web Search Ranking by Incorporating User Behavior Information, SIGIR '06, Aug. 6-11, 2006. Seattle, Washington, USA Copyright 2006 ACM, pp. 19-26.

Joho et al., Effectiveness of Additional Representations for the Search Result Presentation of the Web, (2005). A Comparative Study of the Effectiveness of Search Results Presentation on the Web. In: Lalmas, M., et al. (Eds.) Advances in Information Retrieval, 28th European Conference on Information Retrieval, pp. 302-313.

Lang, A tolerance Rough Set Approach to Clustering Web Search Results Institute of Mathematics Faculty of Mathematics, Informatics and Mechanics Warsaw University, Dec. 2003, pp. 1-77.

(56) References Cited

OTHER PUBLICATIONS

Adamic et al., "how to search a social network" social networks 27 (2005) 187-203, HP Labs, 1501 Page Mill Road, Palo Alto, CA 94304, USA www.esevier.com/locate/socnet © 2005 Elsevier B.V.
U.S. Appl. No. 11/538,383, Jan. 26, 2009, Office Action.
U.S. Appl. No. 11/538,383, Jul. 21, 2009, Office Action.
U.S. Appl. No. 11/538,383, Dec. 14, 2009, Office Action.
U.S. Appl. No. 11/538,383, Apr. 21, 2010, Notice of Allowance.
U.S. Appl. No. 12/839,767, Nov. 29, 2010, Office Action.
U.S. Appl. No. 12/839,767, May 11, 2011, Office Action.
U.S. Appl. No. 12/839,767, Jun. 5, 2012, Office Action.
U.S. Appl. No. 12/839,767, Feb. 4, 2013, Office Action.
U.S. Appl. No. 12/839,767, Oct. 3, 2013, Office Action.
U.S. Appl. No. 12/839,767, Oct. 6, 2014, Office Action.
U.S. Appl. No. 12/839,767, May 7, 2015, Office Action.
U.S. Appl. No. 12/839,767, Jan. 11, 2016, Office Action.
U.S. Appl. No. 13/612,839, Oct. 15, 2013, Office Action.
U.S. Appl. No. 13/612,839, May 22, 2014, Office Action.
U.S. Appl. No. 13/612,839, Oct. 16, 2014, Office Action.
U.S. Appl. No. 13/620,874, Aug. 14, 2014, Office Action.
U.S. Appl. No. 13/620,874, Aug. 18, 2015, Office Action.
U.S. Appl. No. 13/834,716, Oct. 25, 2013, Office Action.
U.S. Appl. No. 13/836,663, May 18, 2015, Office Action.
U.S. Appl. No. 13/836,663, Dec. 4, 2015, Notice of Allowance.
U.S. Appl. No. 13/836,745, Oct. 3, 2014, Office Action.
U.S. Appl. No. 13/836,745, Jun. 2, 2015, Office Action.
U.S. Appl. No. 13/836,745, Dec. 1, 2015, Office Action.
U.S. Appl. No. 12/839,767, Feb. 8, 2017, Office Action.
U.S. Appl. No. 13/620,874, Jan. 12, 2017, Notice of Allowance.
U.S. Appl. No. 12/839,767, Jun. 30, 2017, Office Action.
U.S. Appl. No. 13/612,839, Jun. 6, 2017, Office Action.
U.S. Appl. No. 13/620,874, Jun. 3, 2016, Office Action.
U.S. Appl. No. 13/836,745, Aug. 17, 2016, Office Action.
U.S. Appl. No. 13/612,839, Mar. 8, 2018, Office Action.
U.S. Appl. No. 13/612,839, Sep. 28, 2018, Notice of Allowance.

\* cited by examiner

User Identifier: GoldfishGirl

| Keywords | Web Pages — 730 | Categories — 740 |
|---|---|---|
| Hershey | http://www.hershey.com | Recipes |
| Chocolate | http://www.godiva.com | Food |
| Godiva | http://www.zappos.com | News |
| Baseball | http://www.marriott.com | Law |
| Mets | http://www.washingtonpost.com | Patents |
| Hotels | http://www.nymets.com | Arlington, VA |
| Marriott | http://www.fr.com | Baseball |
| Patents | http://www.dsw.com | Vacation |
| Steve Madden | http://www.aol.com — 731 | Beach — 741 |
| AOL Games | | Animals |
| E. Coli | | Online Games |
| Tai Shan | | Health |
| National Zoo | | |

720 → Keywords column
721 → Chocolate

Fig. 7

IDENTIFICATION OF ELECTRONIC CONTENT SIGNIFICANT TO A USER

CROSS REFERENCE TO RELATED APPLICATIONS

The present application is a continuation of U.S. application Ser. No. 13/836,663, filed Mar. 15, 2013. U.S. application Ser. No. 13/836,663 is a continuation of U.S. application Ser. No. 13/834,716, filed Mar. 15, 2013, and which is a continuation of U.S. application Ser. No. 12/839,767, filed Jul. 20, 2010. U.S. application Ser. No. 13/836,663 is also a continuation of U.S. application Ser. No. 12/839,767. U.S. application Ser. No. 12/839,767 is a continuation of U.S. application Ser. No. 11/538,383, filed Oct. 3, 2006, which is now issued as U.S. Pat. No. 7,783,622, which claims the benefit of and priority to U.S. provisional application No. 60/820,879, filed Jul. 31, 2006 and U.S. provisional application No. 60/820,033, filed Jul. 21, 2006. Each of the aforementioned patent(s) and application(s) are hereby incorporated by reference in their entirety.

TECHNICAL FIELD

This disclosure relates to identification of electronic content that is significant to a user.

BACKGROUND

A user profile that includes information about user preferences, topics of interest to a user and the user's web browsing behavior can be associated with a user. The user profile is generated automatically for the user based on the user's online activities. Additionally, or alternatively, the user profile is generated based on information provided by the user. The information stored within the user profile is used to provide a customized user experience. For example, electronic content can be recommended to a user as content the user is likely to enjoy based on information stored in the user profile.

SUMMARY

In a general aspect, content that is significant to a user is determined. An indication that a user finds content within a document significant is received. The document is analyzed to identify a set of topics associated with the content of the document in response to the received indication. From the set of topics, a subset of topics responsible for the user finding the document significant is identified. A user profile associated with the user is updated based on the subset of topics.

With respect to at least the general aspect, implementations may include one or more of the following features. For example, the subset of topics may include a single topic or the subset of topics may include multiple topics. Content within the document that is related to the subset of topics also may be determined. Updating the user profile based on the subset of topics may include updating the user profile based on the determined content within the document.

Identifying a subset of topics may include enabling the user to perceive the set of topics, prompting the user to select a particular topic that is related to the indication, and receiving, from the user, a selection of the particular topic that is related to the indication.

Identifying a subset of topics may include accessing the user profile associated with the user, determining topics identified as being significant to the user based on the user profile, comparing the set of topics to the determined topics, and based on the comparison, identifying the subset of topics. The topics previously indicated as being significant to the user may be selected by the user.

Identifying the subset of topics may include selecting one of the topics from among the set of topics as a particular topic that is related to the indication, presenting the particular topic to the user, and enabling the user to veto the particular topic as the topic that is related to the indication. As part of the veto, the user may be enabled to identify a different topic as the particular topic.

Receiving an indication that a user finds content within a document significant may include receiving an indication of selection by a user of a content significance user interface element. The content significance user interface element may float within a display that is perceivable to the user. The content significance user interface element may be included in a toolbar of a browser application. The content significance user interface element may be configured such that selection of the element indicates that the user is interested in particular content. The content significance user interface element may be configured such that selection of the element indicates that the user is not interested in particular content.

Analyzing the document to determine more than one topic associated with the content of the document may include determining content being viewed or accessed by the user at the time the indication was received, determining a type for the viewed or accessed content; cleaning up the viewed or accessed content based on the type, and determining significant content from the cleaned-up content. Cleaning up the viewed or accessed content may include removing information that is extraneous to the content actually viewed or accessed by the user.

The content being viewed by the user may include content within the document that was perceivable to the user at the time the indication was received. The content that was perceivable to the user may include content that was presented for display to the user. The content being accessed by the user may include all content within the document regardless of whether the content was currently perceivable to the user at the time the indication was received.

The type for the viewed or accessed content may be determined based on the method used in determining the content being viewed or accessed by the user at the time the indication was received. The content being viewed or accessed may be determined by querying an operating system application programming interface (API), screen capture and/or communications monitoring.

Cleaning up the viewed or accessed content may include removing information, metadata and formatting extraneous to text that includes content actually viewed or accessed by the user. Cleaning up may include performing speech-to-text, optical character recognition, visual pattern recognition, image analysis and/or metadata inspection techniques to determine the content actually viewed or accessed by the user. Determining significant content from the cleaned-up content may include using term frequency—inverse document frequency (TF-IDF), a uniform resource locator (URL), a file name, content of, or URL for, previously viewed web pages, links to the viewed or accessed content and/or the user profile.

A request for content may be received from a user. Information in the user profile may be used to inform content provided in response to the request. The request for content may include a search query, an indication to add content to a video inbox, a request for a web document, a request for an audio and/or video playlist and/or a request for recommendations.

Using the information in the user profile to inform content provided in response to the request may include providing content that the user is most likely to find satisfactory based on information in the user profile related to information the user has found satisfactory in the past. The provided content may be search results, ranked search results, video, audio, video or audio playlists and/or recommended content or web pages.

The user profile associated with a user may be stored on a client device. Updating the user profile may be performed by the client device. A request for content may be received from a user. The request and information from a user profile associated with the user may be transmitted to a host device. The host device may be configured to determine content to provide in response to the request based on the request and information in the user profile.

The user profile associated with a user may be stored on a host device. Updating the user profile may be performed by the host device. A request for content may be received from a user. A user identity associated with the user may be received. A user profile associated with the user identity may be accessed. Content to provide in response to the request may be determined based on information within the accessed user profile. The content may be transmitted to a client device for display to the user.

The content within the document that is related to the particular topic may include keywords, a uniform resource locator (URL) and/or a category associated with the significant content.

Implementations of any of the techniques described may include a method or process, an apparatus or system, or computer software on a computer-accessible medium. The details of particular implementations are set forth below. Other features will be apparent from the description and drawings, and from the claims.

DESCRIPTION OF DRAWINGS

FIG. 4 is an illustration of a GUI that includes a browser and a floating "I Like This" button

FIG. 7 is an illustration of a user profile.

DETAILED DESCRIPTION

Figure 1:
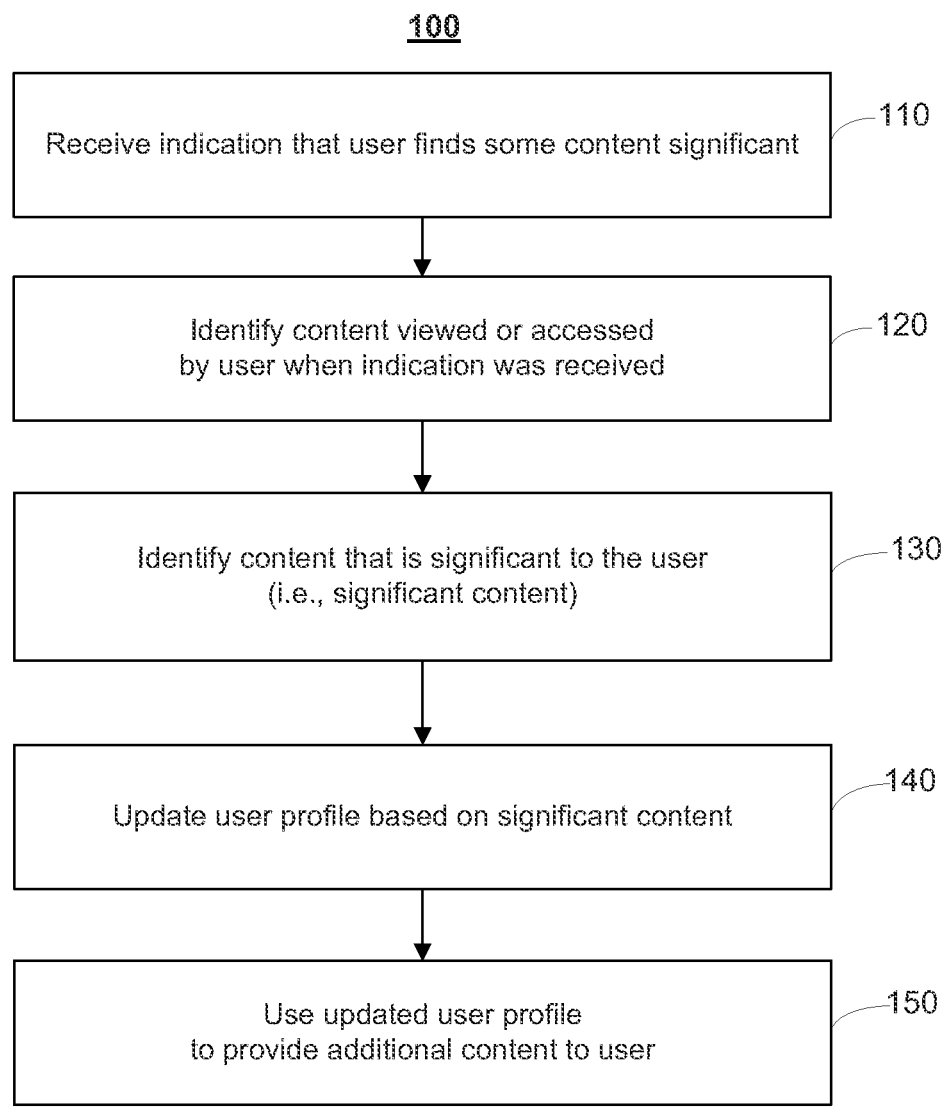
FIG. 1 is a flowchart of an exemplary process for providing content to a user based on content identified to be significant to the user.

An "I Like This" Button may be implemented as a feature in any device capable of enabling a user to browse electronic content and may be used to identify a particular topic of interest among multiple potential topics presented to a user in a single reference. Moreover, the "I Like This" Button may be implemented in a manner that is entirely independent of the content provisioning system, thereby enabling it to be used to indicate interest in any content available across the Internet. The button may be visually presented, for example, as a "floating" button in a user interface that floats over any displayed content or, alternatively, may be presented in the header, menu bar, or toolbar of any such user interface.

Upon selection of the "I Like This" Button, the device and/or a remote system communicating with the device analyzes the electronic content presented to the user at the time of selection of the button. The electronic content may be limited to content presently displayed by the device or, if the content is a web page, to all content contained within the web page, irrespective of what portion of the web page is currently displayed. Textual content may be extracted and searched for key terms/topic based on frequency, user-specified interests, taxonomies, or any other criteria that may be effectively used to focus in on topics of importance in displayed text (e.g., the URL of the web page itself may inform which topics are more important, the referring web page URL may help determine which topics are important, historic search terms used by the user, or any other information determined from passive and active feedback). Once a set of topics are identified based on the content currently perceived by the user, the user may be prompted to choose from among the set of topics to identify the one or more topics that are really of interest to him or her. In an entirely passive system, the system does not prompt the user to select a topic, but instead shows the user the topic that was determined by the system to be of interest and enables the user to change the topic upon his or her own initiative.

If the electronic content is multimedia content having a video and/or audio component, audio metadata and/or speech to text may be used to convert the audio to text that may be searched as described above. Similarly, video metadata or visual pattern recognition/image analysis techniques may be used to determine topics related to displayed video.

After having determined the topic(s) of interest to the user, the topic(s) may be used to update a user profile. The user profile builds up over time and may be used to better tailor any service offerings, advertisements, notices, or alerts sent to the user. The user profile also may be used to modify search results presented to the user in response to a search request (e.g., by adding or removing search results or by changing search result rankings). The topics may be further used to modify the contents of the user's video inbox. The updating of the user profile and video inbox may occur entirely passively or may occur after specifically prompting the user for permission to update his/her user profile and/or video inbox with the determined topics.

The user may select the "I Like This" button to indicate interest in electronic content that is accessible over a network and/or that is locally stored. For example, the user may select the "I Like This" button to indicate interest in a song that he or she has locally stored on a portable MP3 player or a picture taken by him or her that is currently being viewed on a portable camera.

These and additional or alternatively features are described below with reference to FIGS. 1-11.

FIG. 1 is an exemplary process 100 for providing content to a user based on content identified to be significant to the user. Process 100 may be referred to as being performed by a client device, such as client 910 described below with respect to FIGS. 9A and 9B. However, in some implementations, process 100 may be performed by a host device, such as host 930, also described below with respect to FIGS. 9A and 9B, or by some combination of client 910 and host 930.

The client 910 receives an indication that a user finds some content to be significant (110). The indication may be, for example, the selection by a user of a content significance graphical user interface (GUI) element (e.g., an "I Like That" or "I Like This" button), as described in more detail below.

The client 910 determines content that was presently being viewed or accessed by the user when the indication was received (120). The content currently being viewed or accessed by a user may be determined using an operating system (OS), such as, for example, Windows, application programming interface (API), a screen capture or communications monitoring. The API may be used to identify programs that were rendered in a display and made perceivable to the user at the time of selection of the button. For example, a word processing program and an email inbox may have been rendered (e.g., made perceivable to the user) at the time of selection of the "I Like This" button. Thus, client 910 may seek textual information that was presented by the word processing program or the email inbox and may have been viewed by the user at the time the button was selected. In one implementation, for example, the client 910 may identify documents or files that were recently accessed, or are presently being accessed, by the word processing program or the email inbox. The client 910 may access those documents or files and analyze the text therein to determine content to which the user's selection of the "I Like This" button may have been referring.

Additionally, the programs that were rendered may have been active (e.g., maximized) or inactive (e.g., minimized into a tool bar or tray) at the time when the "I Like This" button was selected. If a program was inactive, client 910 may determine that the content currently being accessed by the inactive program is not a good candidate for the significant content because the user was not currently viewing or accessing the inactive content when the "I Like This" button was selected. Similarly, client 910 may determine that content that was accessed by an active program when the "I Like This" button was selected may be more likely to be the content to which the user was referring as significant.

Screen capture also may be used by client 910 to determine windows that were currently displayed to, and perceivable by, the user when the button was selected. For example, only the word processing program may have been on the screen. Thus, client 910 may determine that only content accessed by the word processing program may be a good candidate for the significant content because all other currently rendered programs were not perceivable to the user at the time of selection of the "I Like This" button.

Communications monitoring also may be used by client 910 to determine information that was recently received by a client 910 from an external data source and thus, possibly related to the user's selection of the "I Like This" button. By monitoring a communications stream, the most recent item to have been received, such as, for example, an email or instant message, may be identified by client 910. Since this item was the last one received by the user, and possibly based on information that the user was actively interacting with recent communications (e.g., determination that the API had rendered an email inbox or an instant messaging program (e.g., AIM®)), the client 910 may determine that the recently received item includes content that the user was referring to when the user selected the "I Like This" button.

The client 910 identifies particular content within the viewed or accessed content that is significant to the user (130), as described in more detail below with respect to FIG. 4.

The client 910 updates a user profile associated with the user based on the identified significant content (140). For example, the client 910 may add indicia of the significant content (e.g., one or more keywords, one or more categories or a uniform resource locator ("URL") associated with the significant content) to the user profile. In addition to storing the indicia of significant content in the user profile, the stored indicia also may be tagged as "significant" in order to separate the indicia from other content included in the user profile, such as, for example, interests, favorite web pages or user contacts. The client 910 uses the indicia of the significant content in the user profile, which may build up over time as the user provides additional indications of significant content, to provide additional content to the user (150). By basing any additional content provided by the client 910 to the user on information in the user profile, the additional content may be more likely to be of interest, or significance, to the user.

A content significance GUI element, such as, for example, an "I Like That" or "I Like This" button, may be implemented as a feature in a user interface of any device capable of enabling a user to browse electronic content. In one implementation, the content significance GUI element is an interface element that may be selected by the user to initiate an indication of significant content through a single user action, such as, for example, a click of a mouse button. It may be desirable to allow a user to indicate significant content by performing a single action (or very few actions) in that the user can receive a large benefit (e.g., increased personalization of the user's online experience), while exerting a small amount of extra effort (e.g., performing a small number of actions) to indicate significant content.

For ease of discussion, the content significance GUI element, which in one implementation may be a button, will be subsequently referred to as an "I Like This" button. The "I Like This" button may be implemented in a manner that is entirely independent of the content provisioning system, thereby enabling the button to be used to indicate interest in any content stored locally on the user's computer or available across a private or public data network, such as, for example, the Internet. The button may be visually presented, for example, as a "floating" button in a user interface that floats over any displayed content or, alternatively, may be presented in the header, menu bar, or toolbar of any such user interface.

Figure 2:
FIG. 2 is an illustration of a graphical user interface (GUI) that includes a browser and a floating "I Like This" button 210.

FIG. 2 is an illustration of a GUI 200 that includes a browser and a floating "I Like This" button 210. The browser is displaying a web page associated with the Godiva Chocolatier. The user may select the button 210 to indicate that some content within the web page is significant to the user. In this implementation, the user indicates significant content through a single action, i.e., selection of button 210.

Figure 3:
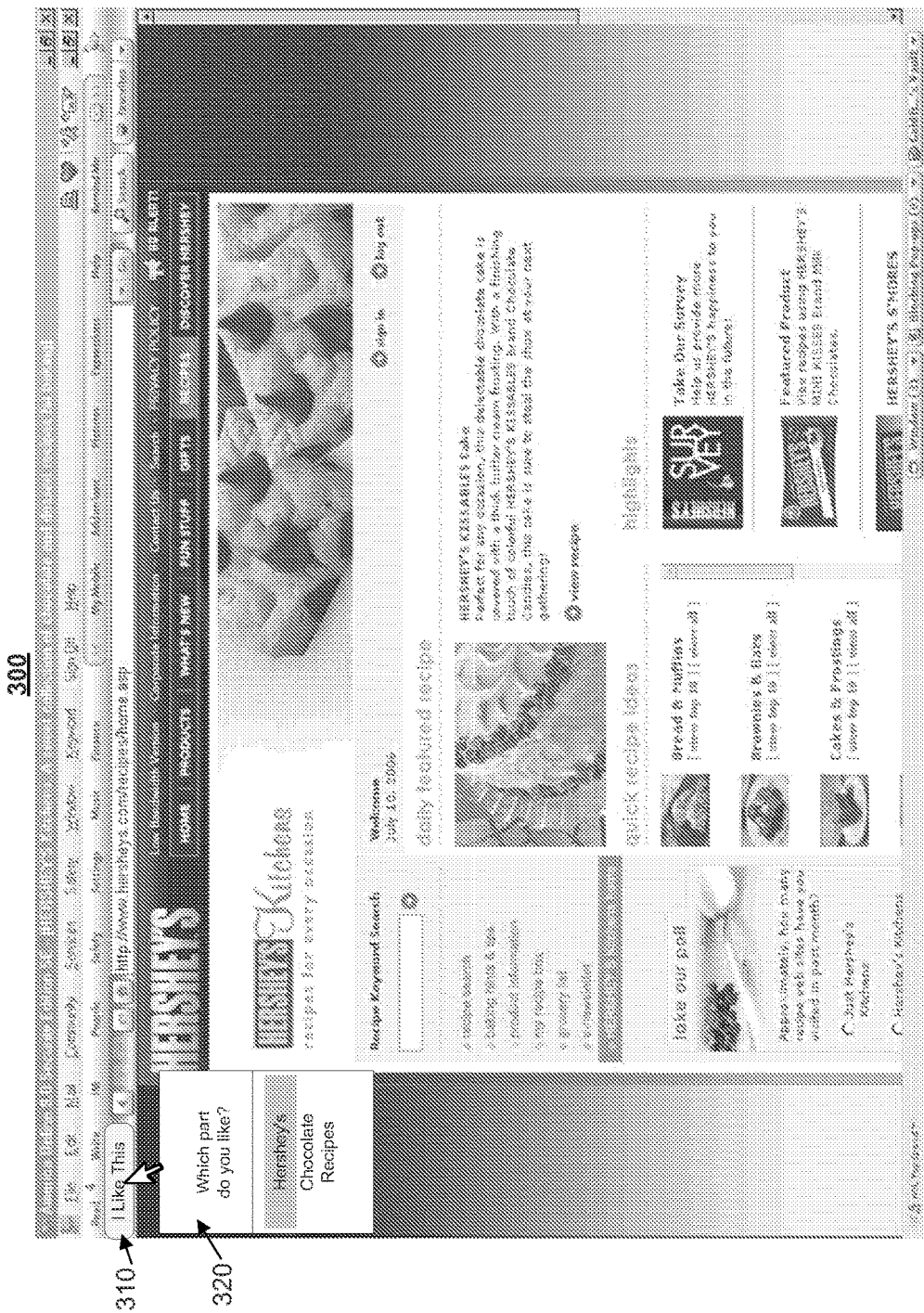
FIG. 3 is an illustration of a GUI that includes a browser and an "I Like This" button included in the toolbar of the browser.

FIG. 3 is an illustration of a GUI 300 that includes a browser and an "I Like This" button 310 included in the toolbar of the browser. The browser is displaying a web page associated with Hershey Kitchen Recipes. The user may select the button 310 to indicate that something shown in the browser is significant to the user.

Upon selection of button 310, the user may be prompted to select one of several possible, or candidate, topics associated with the web page from a drop-down menu 320. In some implementations, the user may select more than one of the candidate topics provided. The candidate topics may be determined based on words and phrases within the Hershey Kitchen Recipes web page (e.g., "Hershey's," "Kitchens," "Recipes," "Ideas," "Chocolate," "Bread" and "Muffins"). Words and phrases from within the web page may be selected based on how frequently the particular word or phrase appears in the web page. For example, the more frequently a word appears in the web page, the more likely the word is significant to the content of the web page, and perhaps, the user. Candidate topics also may be determined based on a category associated with the web page. A category for the web page may be determined from metatags or other metadata embedded in the web page source (e.g., hypertext markup language (HTML)). Such metatags and metadata are typically used by search engines to determine if a web page is related to a particular search query, and thus the same information may be used to determine categories or themes that are important to the overall content of the web page. Additionally, or alternatively, information related to a web page that includes a link to the present web page (e.g., a referring web page) also may be used to determine a topic within the web page that may be significant to the user, and thus, that may be used as a good candidate topic.

In such an implementation, candidates for significant content may be determined prior to a user selecting the button 310. For example, frequently appearing words, metatag information and referring web page information may be determined upon loading, and display, of a web page in order to prepare for, and prior to, user selection of button 310. Alternatively, candidate topics may not be determined until after a user has selected button 310 to avoid using resources (e.g., memory) that may be unnecessarily tied up if the user does not eventually select button 310 in relation to the current web page.

GUI 300 shows that a user has selected "Hershey's" in drop-down menu 320 as the topic that is related to the content the user finds significant. Content within the browser related to "Hershey's" then may be determined, such as, for example, the featured product of Hershey's Mini Kisses, and used to update a user profile associated with the user who selected the "I Like This" button 310. The content associated with the selected topic may be identified based on a determination of portions of the web page that are related to the topic by, for example, determining the portion of the web page in which the word "Hershey's" appears most frequently.

Notably, in this implementation, the user may indicate significant content through two actions—(1) selection of button 310, and (2) selection of a candidate from a list of identified candidates of significant content.

Figure 4:
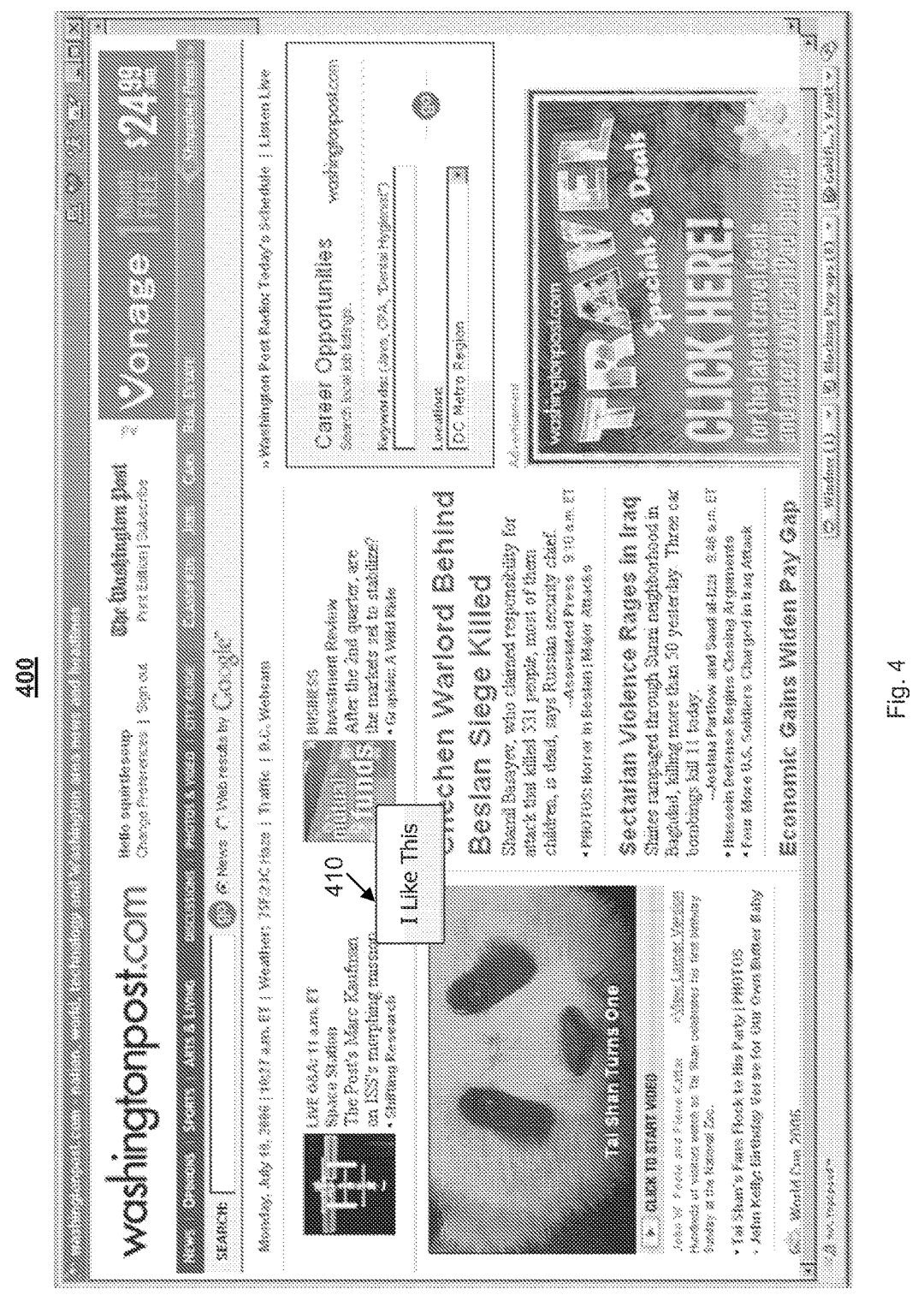

FIG. 4 is an illustration of a GUI 400 that includes a browser and a floating "I Like This" button 410. The browser is displaying a web page associated with the front page of Washingtonpost.com. The front page of a news or other portal web site, such as, for example, the Washingtonpost.com web site, typically includes a multimedia presentation of many different topics, any one of which may be significant to a user. Upon receiving an indication that a user has selected button 410, without any other indication of significant content it may be very difficult to discern which of the many topics presented on the web page is related to the content that the user finds significant. Another indication of significant content may be, for example, (1) selection by the user of a candidate topic of significant content, (2) explicit indication (e.g., typing) by a user of the significant content, or (3) selection (e.g., highlighting) of particular content prior to selection of the "I Like This" button.

To attempt to determine which of many topics included in a particular web page for which a user has selected the "I Like This" button is the topic that is significant to the user, several methods may be used, as described below with respect to FIG. 4A. The process for determining one of many topics as the topic to which the user was referring when the user selected the "I Like This" button may be referred to as disambiguation.

Figure 4A:
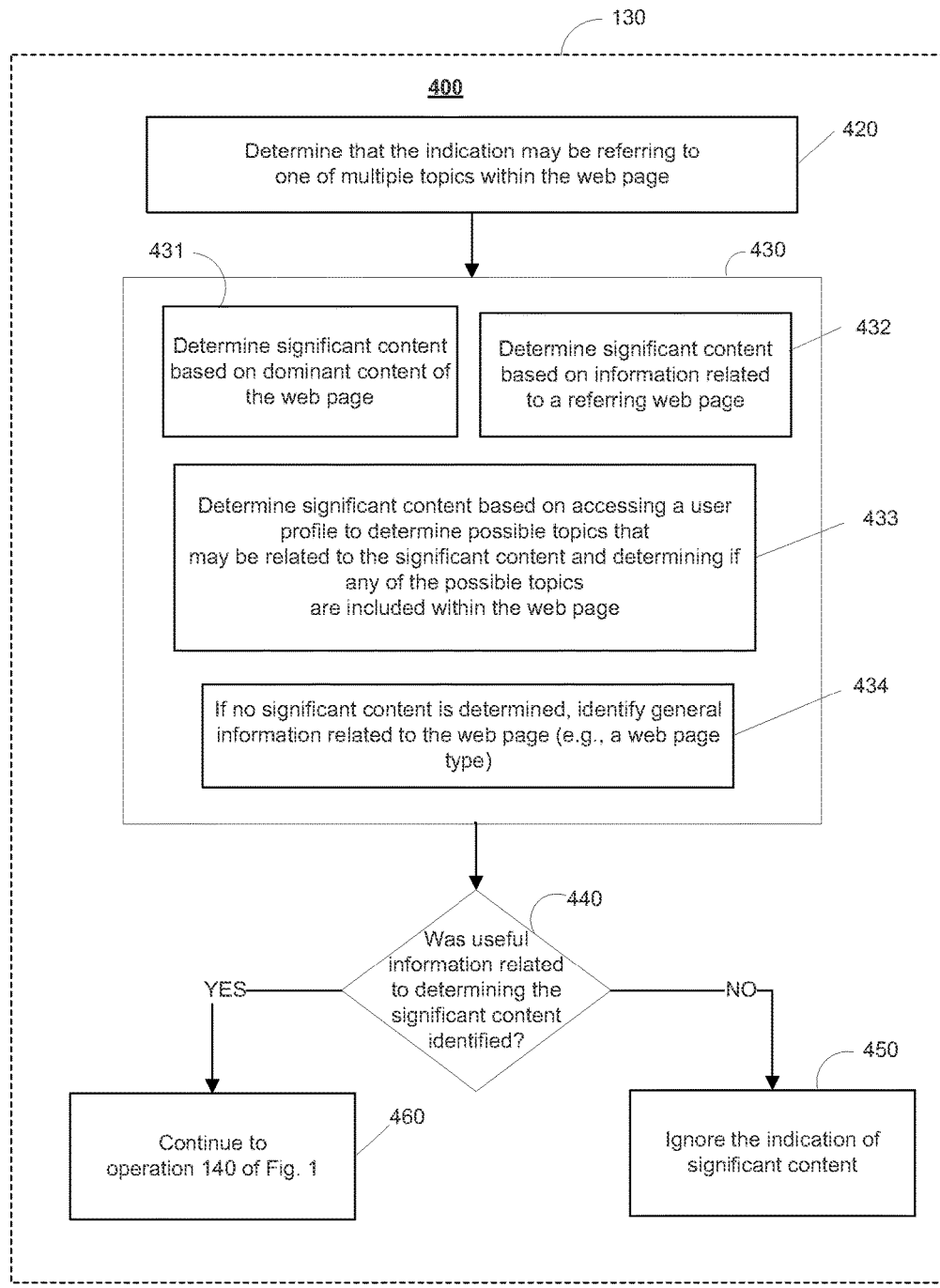
FIG. 4A is a flowchart of an exemplary process for disambiguating topics within a web page to determine a topic that is significant to a user.

FIG. 4A is an exemplary process 400A for disambiguating topics within a web page that includes multiple topics, such as, for example, the Washingtonpost.com web page shown in GUI 400 of FIG. 4, to determine a topic that is significant to a user. Process 400A is an example of a process for performing operation 130 of FIG. 1. Process 400A may be performed by, for example, client 910 described below with respect to FIGS. 9A and 9B. However, in some implementations, process 400A may be performed by host 930, also described below with respect to FIGS. 9A and 9B, or by some combination of client 910 and host 930.

During operation 110 of FIG. 1, client 910 receives an indication that a user finds some content within a web page to be significant. For example, the user may select the "I Like This" button 410 of FIG. 4 to indicate that the user finds some content within the Washingtonpost.com to be significant.

Client 910 determines that the indication may be referring to one of multiple topics within the web page (420). To do so, client 910 may determine a frequency of words within the web page, analyze metatags and metadata associated with the web page or identify information related to a referring web page. If no small number (e.g., one or two) of words within the web page have a much higher frequency than other words, client 910 may determine that the web page includes multiple topics, any one of which may be significant to the user. In another example, if the metatags and metadata are related to more than a small number of topics or categories (e.g., more than two or three), the client 910 may determine that the web page does not include one or two topics that may be of significance to the user. In yet another example, if the referring web page does not, itself, include a reference to, or relationship with a particular topic or category of content, the client 910 may be unable to determine a particular topic to which the user was most likely referring, when the user selected the "I Like This" button 410.

Therefore, client 910 may have to disambiguate the multiple topics related to the web page to determine the significant content by performing one or more of operations 431-434. In particular, client 910 may determine if any content within the web page is the dominant content (431).

For example, audio or video content within a web page currently being viewed or accessed by a user may be assumed to be the dominant content of the web page, and thus the significant content. This may be the case because web pages that include audio and, especially, video content, tend to be focused on the particular audio or video content. However, if for some reason, the audio or video content cannot be said to be the dominant content, such as, for example, when the audio is unrelated to content or topics identified as being present within the web page and/or is playing in the background, other methods may be used to determine the significant content.

Client 910 may determine significant content based on information related to a referring web page (432). For example, the uniform resource locator ("URL") of, or content within, a web page that the user used to arrive at the current web page (e.g., a web page on which the user selected a hyperlink to arrive at the current web page) may include information that can help client 910 determine the content the user finds significant on the current web page. For example, the user may have arrived at the Washingtonpost.com web page after clicking on a link in a web page related to Pandas. Thus, the content within the referring web page (e.g., pandas) may help determine that the content that is significant to the user in the current web page is the story on Tai Shan, the baby Giant Panda.

Client 910 may determine significant content based on accessing a user profile to determine possible topics that may be related to the significant content and determining if any of the possible topics are included within the web page (433). This determination may be successful because users often visit various web pages related to topics in which the user has shown some previous interest. For example, a user profile associated with a user may include information related to the National Zoo. Words, metatags and other information related to the Washingtonpost.com web page may be analyzed to determine if the web page includes information related to the National Zoo. The Washingtonpost.com web page shown in FIG. 4 includes a video of Giant Panda Tai Shan, which thus, may be determined to be the content that is significant to the user.

Techniques other than those described with respect to FIG. 4A also may be used to determine significant content within a web page. For example, the positioning of a cursor also may be used as a clue to the content that the user finds significant. For example, when a user moves a cursor or mouse pointer over a particular portion of a web page, it may be assumed that the portion over which the cursor or mouse pointer includes the content the user finds significant. Alternatively, it may be assumed that a user would not place a cursor or mouse pointer over content in which the user was interested because the cursor or mouse pointer may obstruct the user's view of the content. Thus, content associated with a portion of a web page where a user has placed a cursor or mouse pointer, may automatically be excluded from consideration as being related to content the user found significant.

Additionally, and in some implementations, term frequency—inverse document frequency ("TF-IDF") techniques may be used to determine a topic that dominates a web page, and thus is likely to be significant to a user. TF-IDF is a statistical measure that may be used to evaluate the importance of a particular word, or phrase, to the importance of a document. For example, the importance of a word increases proportionally to the number of times the word appears in a document. However, the popularity is offset by how common the word is in all of the documents in the collection (e.g., corpus) of documents that are being examined. For example, a high TF-IDF value may be due to a high word frequency (in a given document) and a low document frequency of the word in the whole collection of documents (e.g., corpus). The collection of documents may be any documents to which client 910 has access. It is important to determine frequency of a particular word in the analyzed document in relation to the frequency of the word in documents that may, or may not, be related to the same topic in order to receive an accurate determination of the significance of a particular word in a particular document.

A uniform resource locator ("URL") or file name associated with a web page also may be used to aid in the determination of significant content. Furthermore, the content of, or URL for, web pages (e.g., referring web pages) that were viewed prior to the user coming into contact with the viewed or accessed web page may help discern the significant content in the current web page. Moreover, information in a user profile associated with the user may provide clues (e.g., content or topics the user previously found to be significant) as to what content the user presently found significant.

Even if no particular content can be discerned as the significant content within the web page, client 910 may identify general information related to the web page and update the user profile accordingly (434). For example, client 910 may determine that the Washingtonpost.com web page shown in FIG. 4 is a news web page. This determination may be based on the multitude of topics within the web page, the constantly changing nature of the web page and the number of links to, and from, the main web page of the Washington Post. Thus, client 910 may determine that the user likes news web pages. The significant content portion of a user profile associated with the user may therefore be updated with the significant content of "news" or "news web pages."

Client 910 determines whether any useful information related to determining the significant content was identified (440). More particularly, client 910 determines if any significant content was determined during at least one of operations 431-434.

If significant content was determined, client 910 proceeds to perform operation 140 of FIG. 1 (460). If no significant content was determined by client 910 (e.g., not even information regarding a type of web page), client 910 disregards or ignores the indication that the user finds some content within the particular web page to be significant (450).

Figure 5:
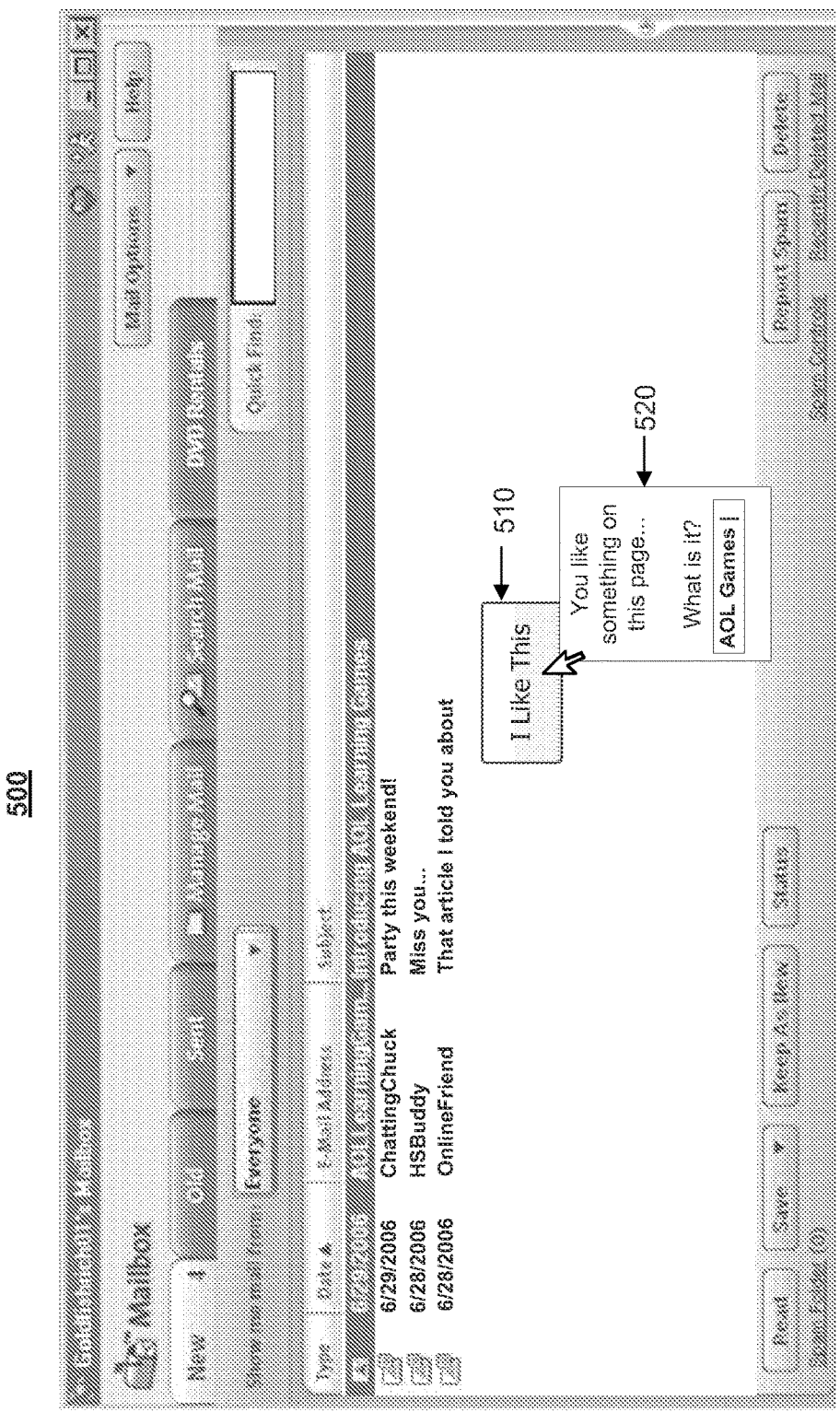
FIG. 5 is an illustration of a GUI that includes an email inbox and a floating "I Like This" button.

FIG. 5 is an illustration of a GUI 500 that includes an email inbox and a floating "I Like This" button 510. A user may select an "I Like This" button to indicate significant content within currently viewed or accessed content that is stored locally or across a data network. An email inbox, such as that shown in GUI 500, may be stored locally (e.g., while communicating across a network 920 to receive incoming messages and transmit outgoing messages), or in a data store accessible across a data network, such as, for example, in an email server provided by an Online (or Internet) Service Provider (e.g., AOL LLC) or online email account provider across the Internet. Similar to the "I Like This" button 310 of FIG. 3, selection of the button 510 may cause a pop-up or drop-down menu to appear and prompt a user for input. Here, drop-down menu 520 may ask a user to affirmatively supply information that identifies the content that the user finds significant. As shown, the user has indicated that content related to "AOL Games" is significant. Accordingly, in this implementation, like that shown in FIG. 3, the user indicates significant content through two actions—(1) selection of button 510, and (2) manually typing in a topic or other identifier of significant content.

Figure 6:
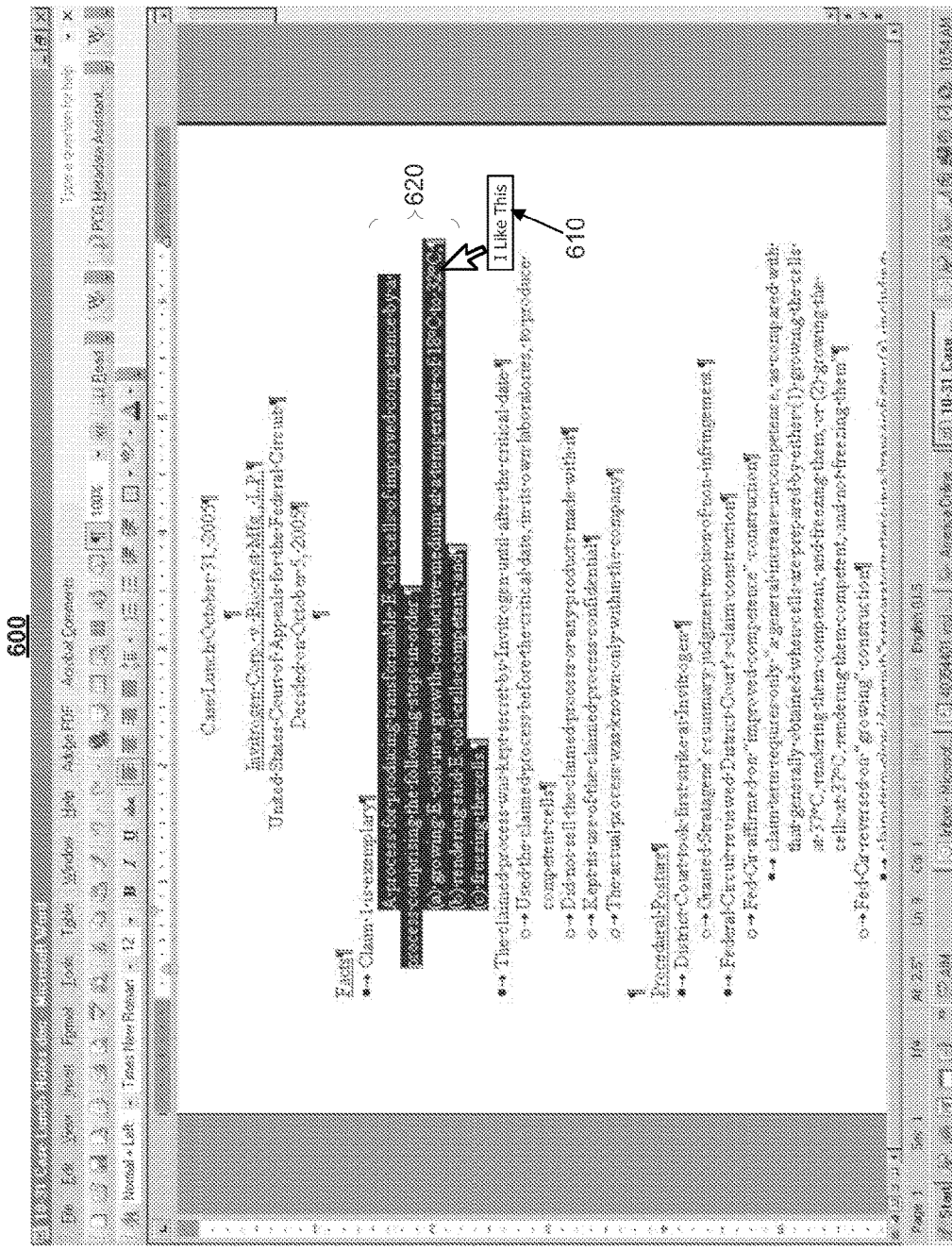
FIG. 6 is an illustration of a GUI that is configured to allow a user to select text from within a document and indicate that the text is significant to the user.

FIG. 6 is an illustration of a GUI 600 that is configured to allow a user to select text from within a document and indicate that the text is significant to the user. More particularly, GUI 600 includes a word processing window showing a document entitled "10-31 Case Lunch Notes." The text document may be stored locally or online, such as, for example, in a virtual hard drive. The user may highlight a portion of the document, as shown at 620, and perform a selection action, such as, for example, right-clicking the mouse, hovering over the highlighted text or touching one or more shortcut keys. Upon performing the selection action, an "I Like This" button 610 may appear for the user to select. The selection of button 610 may indicate that the user likes the highlighted portion of the text, which, as shown, relates to a process for producing *E. Coli* cells. In this implementation, the user indicates significant content through two actions—(1) highlighting text that the user finds significant, and (2) selection of button 610.

Upon selection of an "I Like This" button, a device (e.g., client 910 of FIG. 9A or 9B) and/or a remote system communicating with the device (e.g., host 930 of FIG. 9A or 9B), may be configured to analyze content being viewed or accessed by a user at the time of selection of the button, as described above with respect to FIGS. 1-4, 4A, 5 and 6. In two user action implementations, such as, for example, when a user performs some step before, or after, selection of an "I Like This" button to explicitly indicate the content which the user finds significant, analysis of the content within a document (e.g., a web page) to determine the content that the user finds significant may not be necessary. In single user action implementations, such as, for example, when a user selects an "I Like This" button without providing an indication of content to which the selection of the button refers, the content within a document, such as, for example, a web page may be analyzed to determine the content that the user finds significant.

In one implementation, the electronic content analyzed, as described above, may be limited to content presently displayed by the device. For example, the content may be a web page, where only a portion of the web page is currently perceivable to the user (e.g., the user may cause another portion of the web page to become perceivable by using a scroll bar, an arrow or a "page up" or "page down" command). In this example, the electronic content analyzed to determine significant content may be limited to the portion of the web page that was perceivable by the user at the time when the "I Like This" button was selected. In another implementation, all content included within the electronic content may be analyzed to determine the significant content, regardless of how much of the electronic content is, or was, perceivable to the user. For example, for a web page, the entire electronic content included within the web page may be analyzed even if only a portion of the web page was perceivable to the user when the "I Like This" button was selected.

Textual content may be extracted and searched for particular content that may be significant to the user based on frequency of terms within the textual content, user-specified interests (e.g., as stored in a user profile), taxonomies or any other criteria that may be effectively used to focus in on topics of importance in displayed text. For example, a URL of a web page may inform which topics are important, a URL of, or content within, a referring web page may help determine which topics are important, historic search terms entered by the user, web pages or documents previously viewed by the user or any other information determined from passive and active feedback also may be useful in determining significant content. In some implementations, metadata, speech to text conversions and visual pattern recognition/image analysis techniques may be used to convert audio or video included in multimedia content being viewed or accessed by a user, to text that may be searched for particular content that may be significant to a user.

FIG. 7 is an illustration of a user profile 700. The user profile 700 includes a user identifier 710 to associate the user profile with a particular user. The user identifier 710 may be a screen name (e.g., GoldfishGirl), an IP address, a user's real name or some other information that identifies the particular user.

The user profile includes keywords 720, web pages 730 and categories 740 that are significant to the user or are related to content that is significant to the user. The keywords 720, web pages 730 and categories 740 may have been determined based on selection by the user of an "I Like This" button or by some other means, such as, for example, by a user filling out an interest survey. The keywords 720 may be words that were included in, or derived from, content that the user indicated was significant or may be words that are related to content that the user likes. The web pages 730 also may be actual web pages the user has viewed and indicated as significant, or merely web pages that are related to topics in which the user has indicated an interest. The categories 740 may be determined from an ontology or taxonomy based on, and related to, the determined keywords and web pages. In one example, user profile 700 includes a keyword "chocolate" 721, a web page http://www.aol.com 731 and a category beach 741.

As new content is determined to be significant to the user, keywords 720, web pages 730, categories 740 or other indicia related to the new content may be added to the user profile 700 during operation 140 of FIG. 1. The updating of the user profile 700 may occur entirely passively or may occur after specifically prompting the user for permission to update the user profile 700 based on the determined significant content.

The user profile 700 may build up over time and may be used to help provide the user with additional content that the user is most likely to find interesting or significant. For example, information in the user profile 700 may be used to better tailor any service offerings, advertisements, notices or alerts sent to the user, content recommended to the user, content provided in a video or audio inbox associated with the user or the order of content within a document that is presented to the user. The user profile 700 also may be used to modify search results presented to the user in response to a search request by, for example, adding or removing search results or by changing search result rankings or groupings.

The user profile 700 may be stored locally on a client 910 device or, alternatively, across a network 920 at a host 930 device, as described in detail below with respect to FIGS. 9A, 9B, 10A and 10B.

Figure 8:
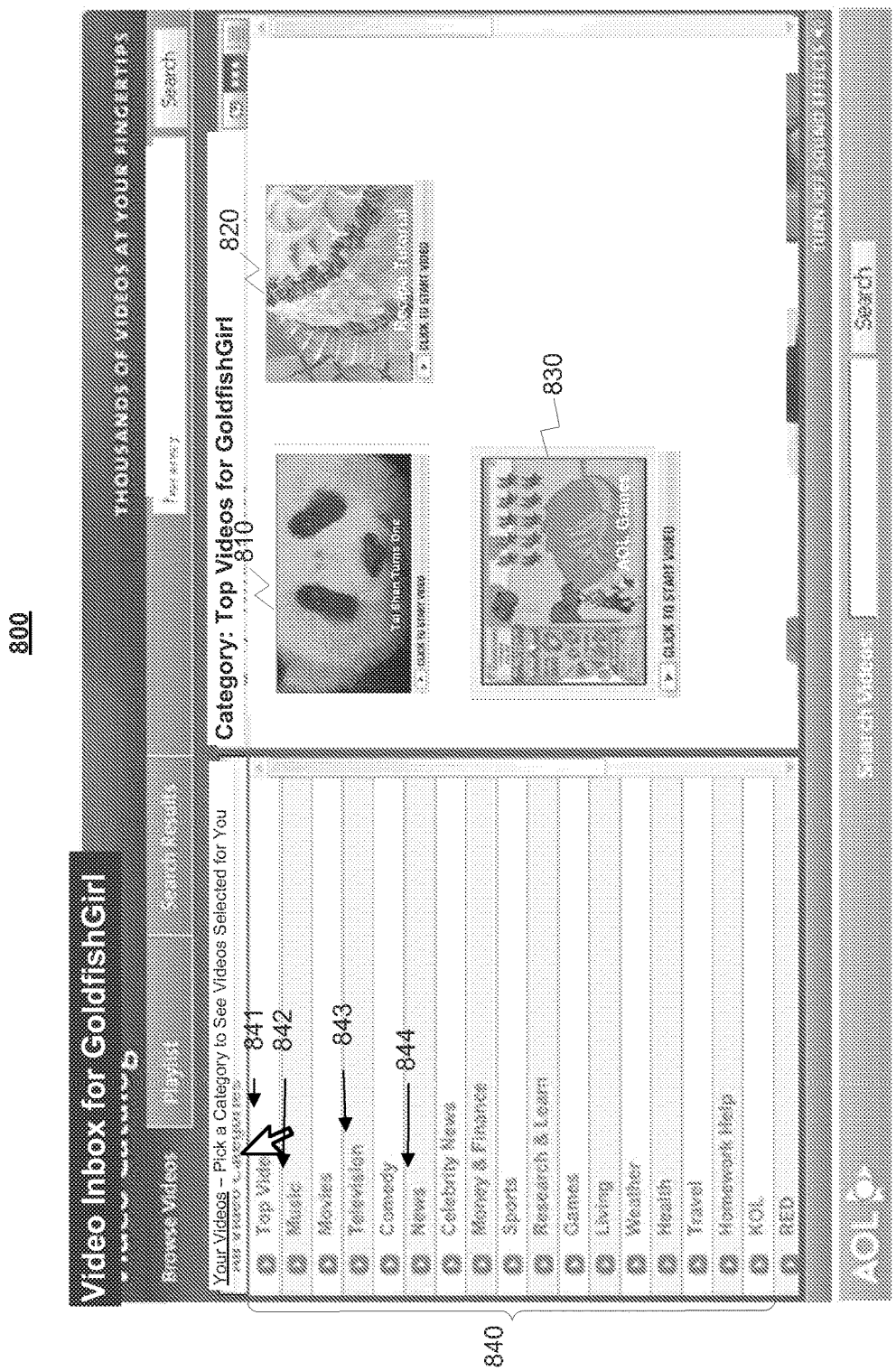
FIG. 8 is an illustration of a GUI for displaying a video inbox to a user.

FIG. 8 is an illustration of a GUI 800 for displaying a video inbox to a user. A video inbox may display video content that has been tailored to a particular user's interests. As such, additional content (e.g., video content) is provided to the user during operation 150 of FIG. 1 based on an updated user profile associated with the user. The video inbox shown in GUI 800 includes various categories 840, such as top videos 841, which may include videos that the user is likely to enjoy based on the user's most recent indications of subject matter that is significant. The top videos category 841 is currently showing a video 810 that is related to Tai Shan the Giant Panda at the National Zoo, a video 820 that is related to a Hershey chocolate recipe and a video 830 that is related to AOL Games. Other categories may include music 842, television 843 and news 844, as shown. The updating of the video inbox may occur entirely passively or may occur after specifically prompting the user for permission to update the video inbox based on information in the user profile related to content indicated as significant by the user. Additionally, a user may be able to add content to, or delete content from, the user's video inbox. This type of editing also may be used to update the user's profile so that content provided to the user in the future may be more responsive to the user's interests.

Figure 9A:
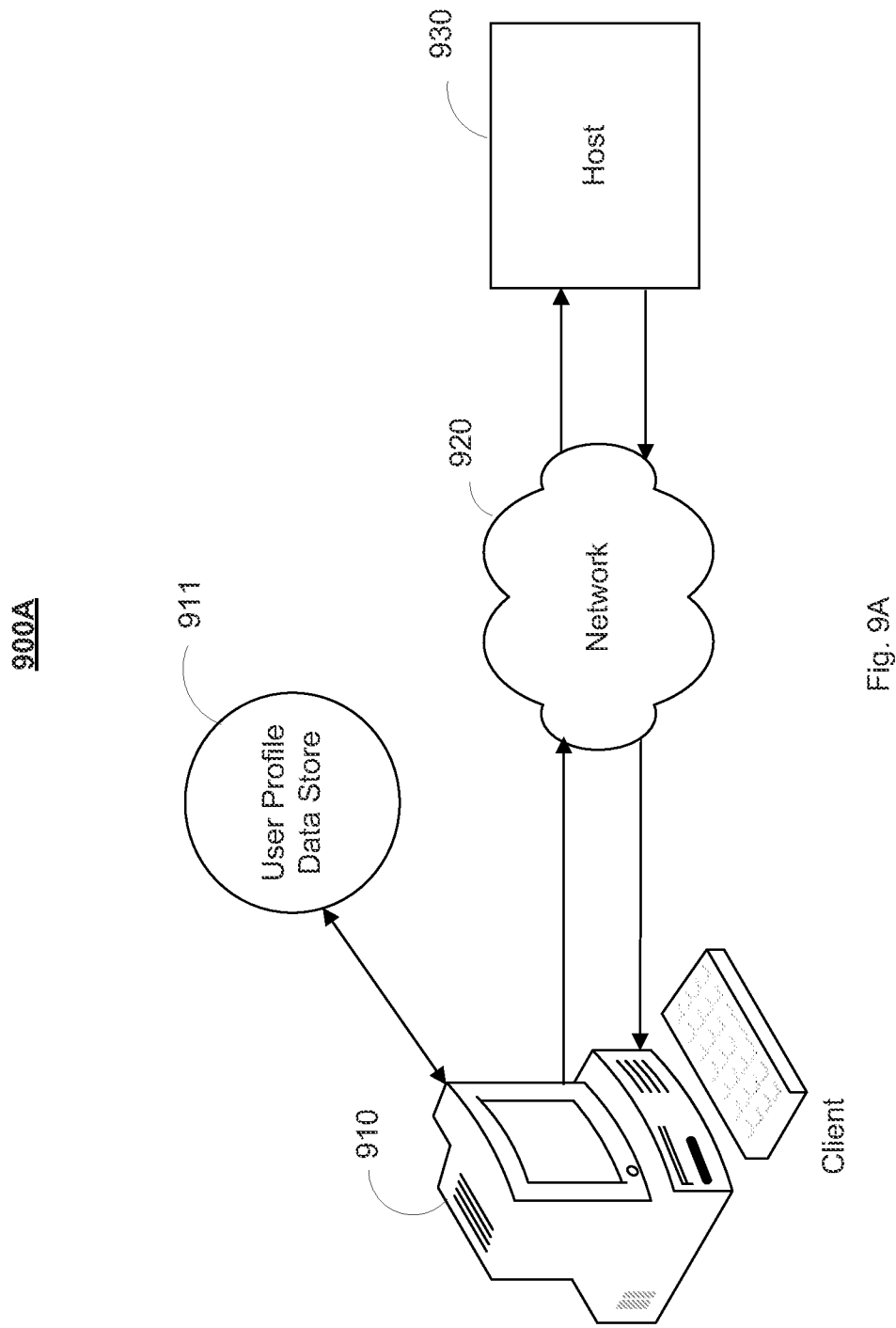
FIGS. 9A and 9B show two exemplary communications systems for determining information that is significant to a user, updating a user profile with the significant information and providing additional information to the user based on the user profile.
Figure 9B:
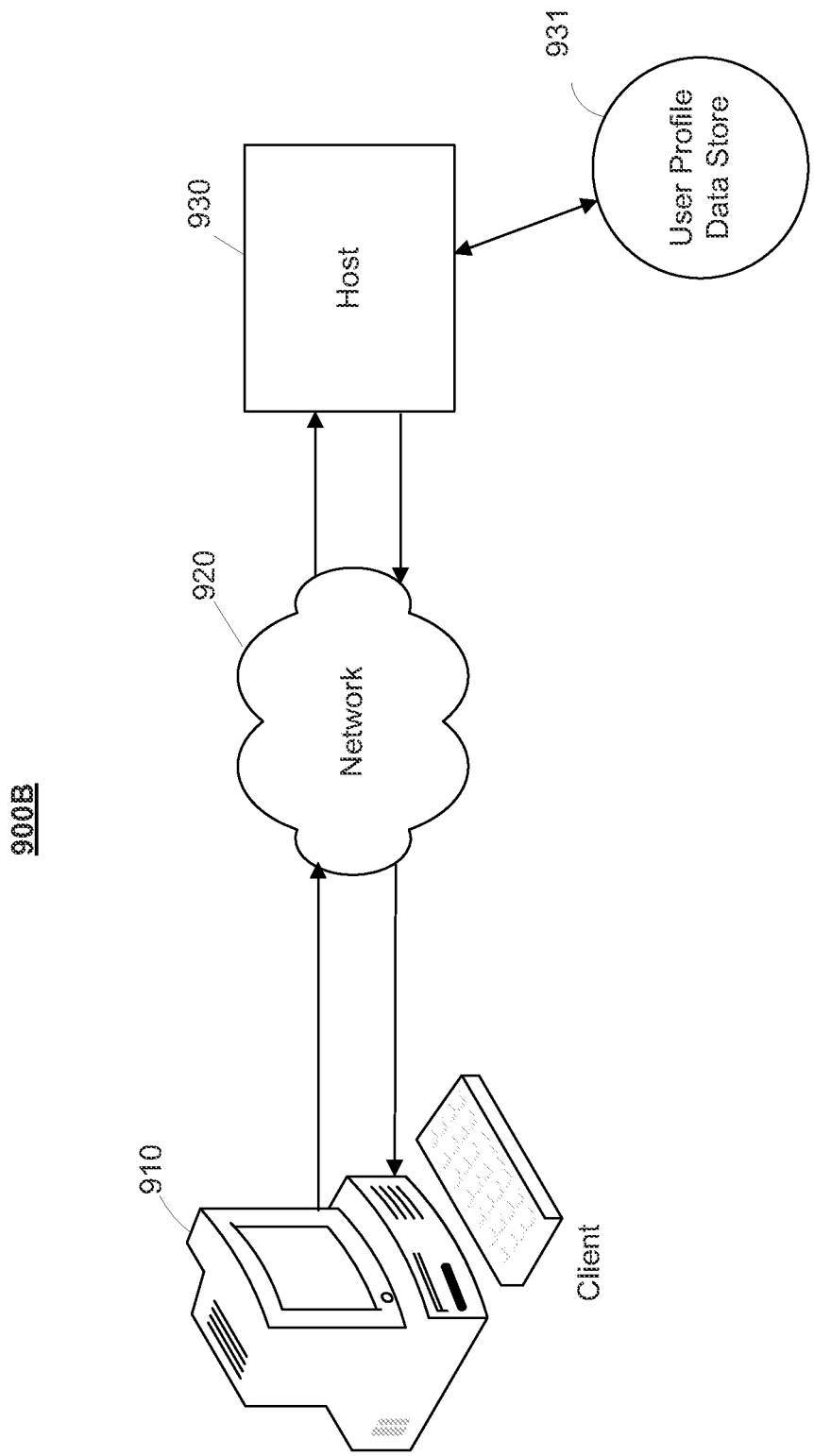

FIGS. 9A and 9B show exemplary communications systems 900A and 900B, respectively, for determining information that is significant to a user, updating a user profile with the significant information and providing additional information to the user based on the user profile. Systems 900A and 900B both include a client 910 that communicates with a host 930 via a network 920.

Each of the client 910 and the host 930 may be implemented by, for example, a general-purpose computer capable of responding to and executing instructions in a defined manner, a personal computer, a special-purpose computer, a workstation, a server, a device, a component, other equipment or some combination thereof capable of responding to and executing instructions. The client 910 and host 930 may be configured to receive instructions from, for example, a software application, a program, a piece of code, a device, a computer, a computer system, or a combination thereof, which independently or collectively direct operations, as described herein. The instructions may be embodied permanently or temporarily in any type of machine, component, equipment, storage medium, or propagated signal that is capable of being delivered to the client 910 or the host 930.

The client 910 may include one or more devices capable of accessing content on the host 930. The host 930 may include a general-purpose computer (e.g., a personal computer (PC)) capable of responding to and executing instructions in a defined manner, a workstation, a notebook computer, a PDA ("Personal Digital Assistant"), a wireless phone, a component, other equipment, or some combination of these items that is capable of responding to and executing instructions.

In one implementation, the client 910 includes one or more information retrieval software applications (e.g., a browser, a mail application, an instant messaging client, an Internet service provider client, a media player, or an AOL TV or other integrated client) capable of receiving one or more data units. The information retrieval applications may run on a general-purpose operating system and a hardware platform that includes a general-purpose processor and specialized hardware for graphics, communications and/or other capabilities. In another implementation, the client 910 may include a wireless telephone running a micro-browser application on a reduced operating system with general purpose and specialized hardware capable of operating in mobile environments.

The network 920 includes hardware and/or software capable of enabling direct or indirect communications between the client 910 and the search system 130. As such, the network 920 may include a direct link between the client 910 and the search system 130, or it may include one or more networks or sub networks between them (not shown). Each network or sub network may include, for example, a wired or wireless data pathway capable of carrying and receiving data. Examples of the delivery network include the Internet, the World Wide Web, a WAN ("Wide Area Network"), a LAN ("Local Area Network"), analog or digital wired and wireless telephone networks, radio, television, cable, satellite, and/or any other delivery mechanism for carrying data.

The host 930 may include a general-purpose computer having a central processor unit (CPU), and memory/storage devices that store data and various programs such as an operating system and one or more application programs. Other examples of a host 930 includes a workstation, a server, a special purpose device or component, a broadcast system, other equipment, or some combination thereof capable of responding to and executing instructions in a defined manner. The host 930 also may include an input/output (I/O) device (e.g., video and audio input and conversion capability), and peripheral equipment such as a communications card or device (e.g., a modem or a network adapter) for exchanging data with the network 920.

The host 930 is generally capable of executing instructions under the command of a controller. The host 930 may be used to provide content to the client 910. The controller may be implemented by a software application loaded on the host 930 for commanding and directing communications exchanged with the client 910. Other examples of the controller include a program, a piece of code, an instruction, a device, a computer, a computer system, or a combination thereof, for independently or collectively instructing the client 910 or the host 930 to interact and operate as described. The host 930 may be embodied permanently or temporarily in any type of machine, component, physical or virtual equipment, storage medium, or propagated signal capable of providing instructions to the client 910 or the host 930.

In system 900A, the client 910 is configured to access a user profile data store 911 where a user profile associated with a user is stored. The client 910 in system 900A may determine content that is significant to a user, update the user profile based on the significant content and communicate to the host 930 information related to the updated user profile and a user request for content (e.g., a search request). The host 930 may determine content that is responsive to the request and the updated user profile information (e.g., search results). In some implementations, the entire updated user profile may be provided to host 930 by client 910. Alternatively, only a portion of the updated user profile that client 910 has determined to be relevant to the request for content may be provided to host 930.

Alternatively, in system 900B, the host 930, rather than the client 910, is configured to access a user profile data store 931 where user profiles are stored. The host 930 may receive content and an indication of a user identity associated with the content from the client 910. The host 930 may determine a portion of the content that is significant and update a user profile associated with the user based on the significant content. As such, at a later time when a request for content is received by the client 910 from the user, the client 910 may send the user request and an indication of the user identity associated with the requesting user to the host 930, and the host 930 may access a user profile (that has been previously updated) associated with the user identity and determine content that is responsive to the request and the user profile information.

Figure 10A:
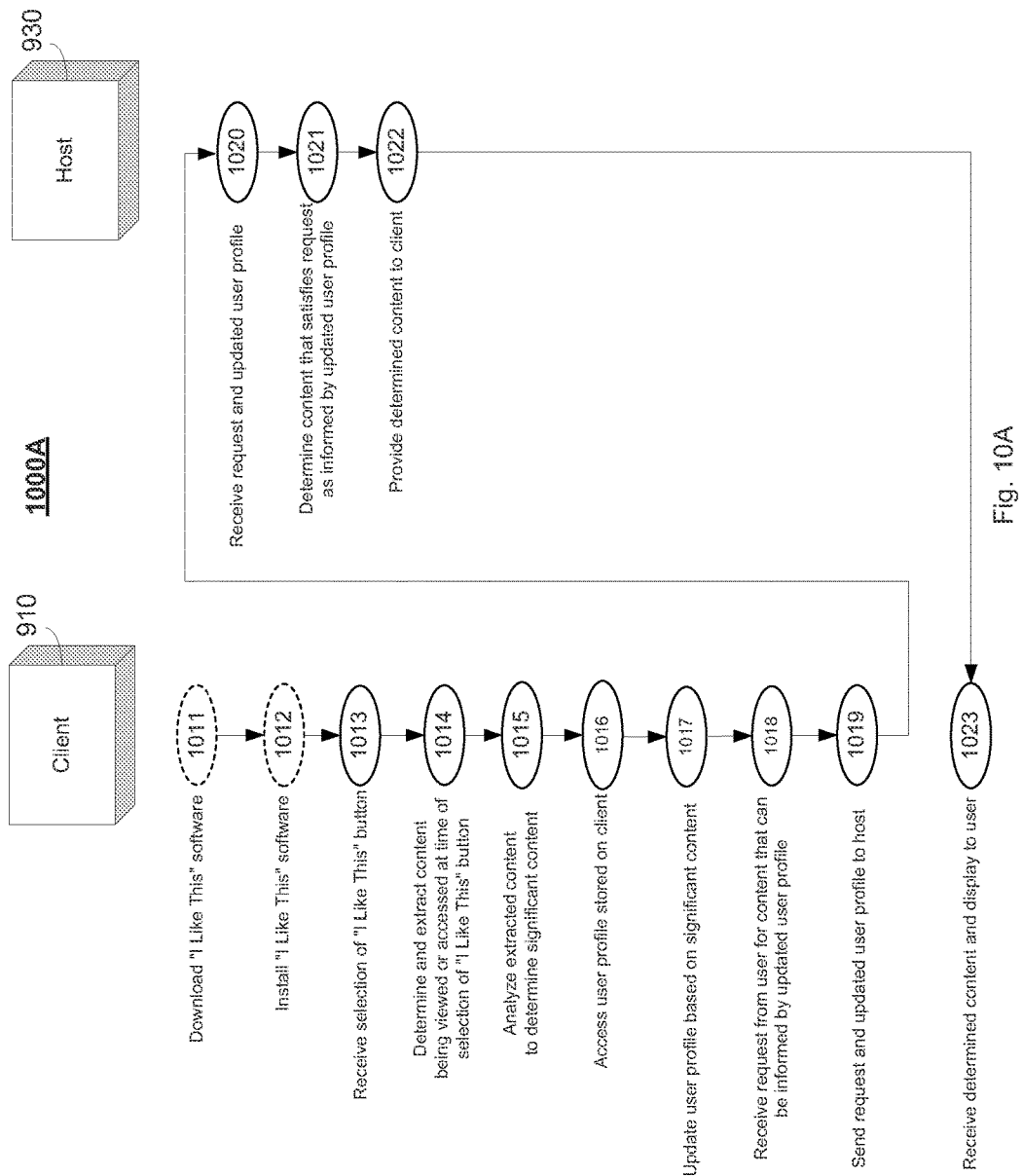
FIGS. 10A and 10B are two exemplary processes for determining information that is significant to a user, updating a user profile based on the significant information and providing additional information to the user based on the updated user profile.
Figure 10B:
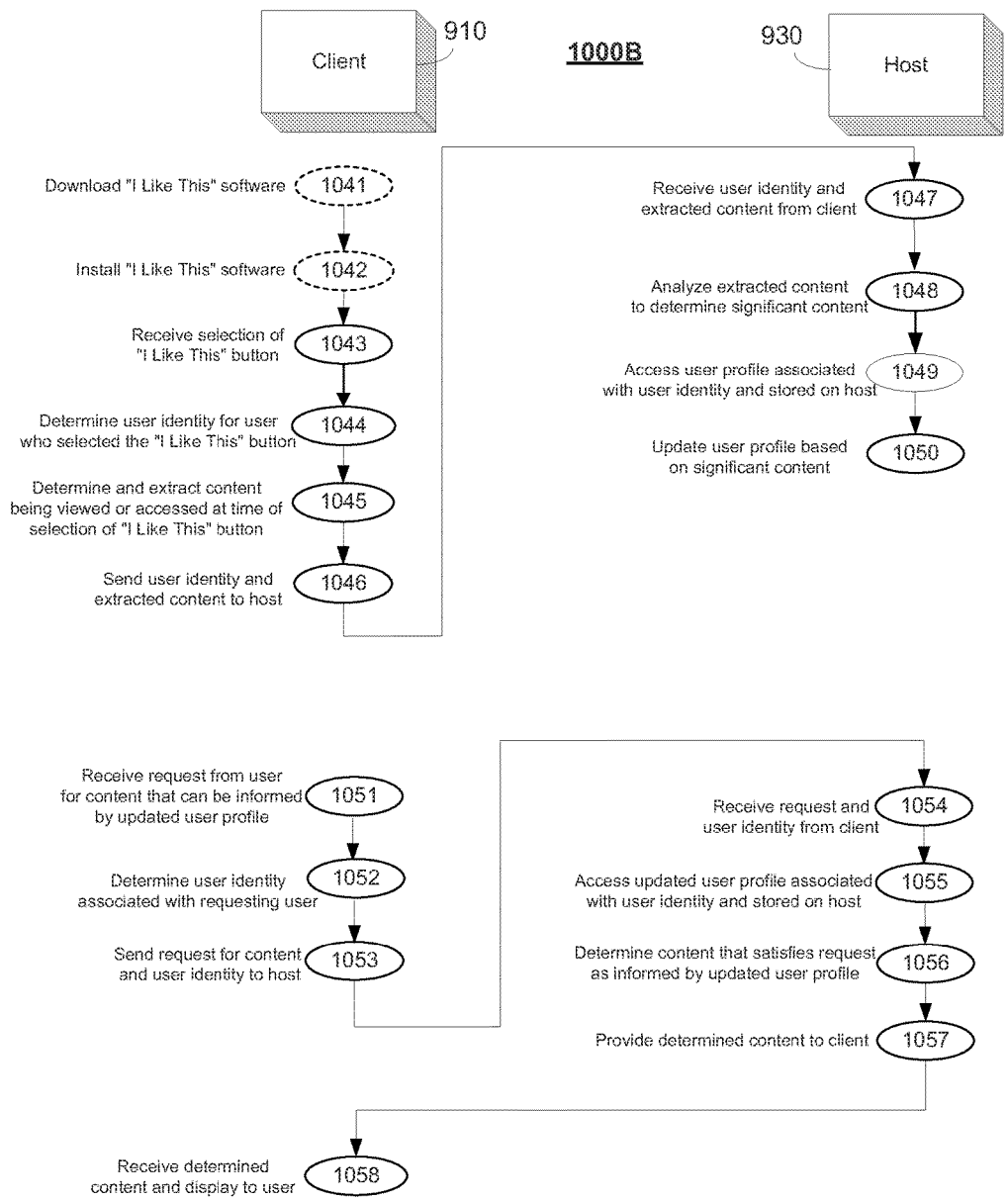

FIGS. 10A and 10B are exemplary processes 1000A and 1000B, respectively, for determining information that is significant to a user, updating a user profile based on the significant information and providing additional information to the user based on the updated user profile. Process 1000A may be performed, for example, by communications system 900A of FIG. 9A and process 1000B may be performed, for example, by communications system 900B of FIG. 9B. FIGS. 10A and 10B illustrates one implementation of how performance of the various operations of processes 1000A and 1000B may be shared between the host 930 and the client 910.

In process 1000A, the client 910 optionally downloads (1011) and installs (1012) "I Like This" software. Operations 1011 and 1012 may not be performed, for example, in implementations, where the "I Like This" software has already been downloaded from the Internet, or uploaded from a disc or other media, by client 910 and installed.

The client 910 receives an indication that an "I Like This" button was selected by a user (1013). Operations 1011-1013 may correspond to operation 110 of FIG. 1.

The client 910 determines and extracts content that was being viewed or accessed by the user at the time of selection of the "I Like This" button (1014, which corresponds to operation 120 of FIG. 1). The extracted content is analyzed by the client 910 to determine significant content within the extracted content (1015, which corresponds to operation 130 of FIG. 1). Alternatively, or additionally, the host 930 may perform operation 1015. The client 910 accesses a locally stored user profile from a user profile data store 911 (as shown in FIG. 9A) (1016) and updates the user profile based on the determined significant content (1017). Operations 1016-1017 may correspond to operation 140 of FIG. 1.

The client 910 receives a request from a user for content that can be informed by information included in a user profile associated with the user (1018). The request may include, for example, a search query, entry into a video inbox, an "update video inbox" command, a request for recommended content or advertisements or services that may be provided to the user in response to some other user action.

The client 910 sends to the host 930, or enables the host 930 to access, the request and some, or all, of the updated user profile information (1019). If only a portion of the updated user profile information is sent to, or accessed by, the host 930, the portion may be determined by the client 910 based on the substance of the user request. For example, if a user enters a search query related to the National Zoo, the client 910 may send to the host 930, or enable the host 930 to access, all information included in the user profile associated with zoos, animals or Washington, D.C.

The host 930 receives, or accesses, the request and the updated user profile information (1020). The host 930 determines content that satisfies the request and the updated user profile information (1021). The information in the updated user profile may be used to influence the determination of content that satisfies the request or the presentation of the content that satisfies the request. For example, the updated user profile may affect whether search results are provided to the user, or how the search results that are provided to the user are ranked or grouped. Also related to a search query, the updated user profile may be used to disambiguate a search query. For example, the user may enter the search query "Eagles." The search query may relate to the football team, the bird or the band. A user profile associated with the user may include a large amount of music references, and thus, it may be determined that the search query most likely relates to the band, rather than the football team or the bird. In this way, search queries may be personalized for a user without requiring any additional steps to be taken by the user. In another example, the updated user profile may be used to determine content to be included in a video inbox, advertisements or services to be provided to a user or content that may be recommended to the user. The host 930 sends to the client 910, or enables the client 910 to access, the determined content (1022) such that the client 910 receives the determined content and enables the user to perceive the content by, for example, visually displaying the content to the user (1023). Operations 1018-1023 may correspond to operation 150 of FIG. 1.

In the implementation of FIGS. 9A and 10A, user profiles are stored locally (i.e., local to the client system 910), and thus, information related to content that a user finds significant, and content that has been viewed or accessed by the user may be kept completely confidential. Only the user profile information that is necessary to help determine content that satisfies a user request need be transmitted over the network 920 to the host 930. In addition, even if all of the user profile information is sent to the host 930, the user profile information may be sent anonymously, so that if the information is intercepted by a third party, the information cannot be associated with the user.

In process 1000B, the client 910 optionally downloads (1041) and installs (1042) "I Like This" software, similar to that described above with respect to process 1000A of FIG. 10A. The client 910 receives an indication that an "I Like This" button was selected (1043). The client 910 determines a user identity for the user who selected the "I Like This" button (1044). The user identity may be, for example, a screen name with which the user logged into an online service provider or Internet service provider (e.g., AOL®), an IP address or an email address. Operations 1041-1044 may correspond to operation 110 of FIG. 1.

The client 910 determines and extracts content that was being viewed or accessed by the user at the time of selection of the "I Like This" button (1045, which corresponds to operation 120 of FIG. 1).

The client 910 sends to the host 930, or enables the host 930 to access, the user identity and the extracted content (1046). The host 930 receives, or accesses, the user identity and the extracted content (1047). The host 930 analyzes the extracted content to determine the significant content (1048). Alternatively, the client 910 may perform operation 1048. Operations 1046-1048 may correspond to operation 130 of FIG. 1.

The host 930 accesses a user profile associated with the user identity and is stored on the host 930 (as shown in FIG. 9B) (1049). The host 930 updates the user profile with the significant content (1050). Operations 1049-1050 may correspond to operation 140 of FIG. 1.

The client 910 receives a request from a user for content that can be informed by information included in a user profile associated with the user (1051). The client 910 determines a user identity associated with the user who requested the information (1052) and sends to the host 930, or enables the host 930 to access, the request for content and the user identity (1053). The host 930 receives, or accesses, the request and user identity from the client 910 (1054). The host 930 accesses a user profile associated with the user identity and that is stored on the host 930 (1055). The user profile may have previously been updated based on content the user found to be significant. The host 930 determines content that satisfies the request and the (updated) user profile (1056) and provides the determined content to the client 910 (1057). The client 910 receives, or accesses the determined content and enables the user to perceive the content by, for example, visually displaying the content to the user (1058). Operations 1051-1058 may correspond to operation 150 of FIG. 1.

In the implementation of FIGS. 9B and 10B, user profiles may be stored on the host 930 (e.g., the user profiles may be "hosted") in order to put less of a storage burden on the client 910 and decrease the likelihood of distortion or corruption of the user profile or the information stored therein. Hosting a user profile also allows for portability of the information, such that information in the user profile may be used to inform a request for content independently of the location from where the user requests the content. Security and privacy concerns may be dealt with in the configuration of FIGS. 9B and 10B by requiring authentication by a user before a user profile associated with the user may be used to inform a request for content. Furthermore, an encrypted version of an identifier related to the user identity may be provided to the host 930 such that any information in a user profile stored on the host 930 cannot be traced back to a particular user.

Figure 11:
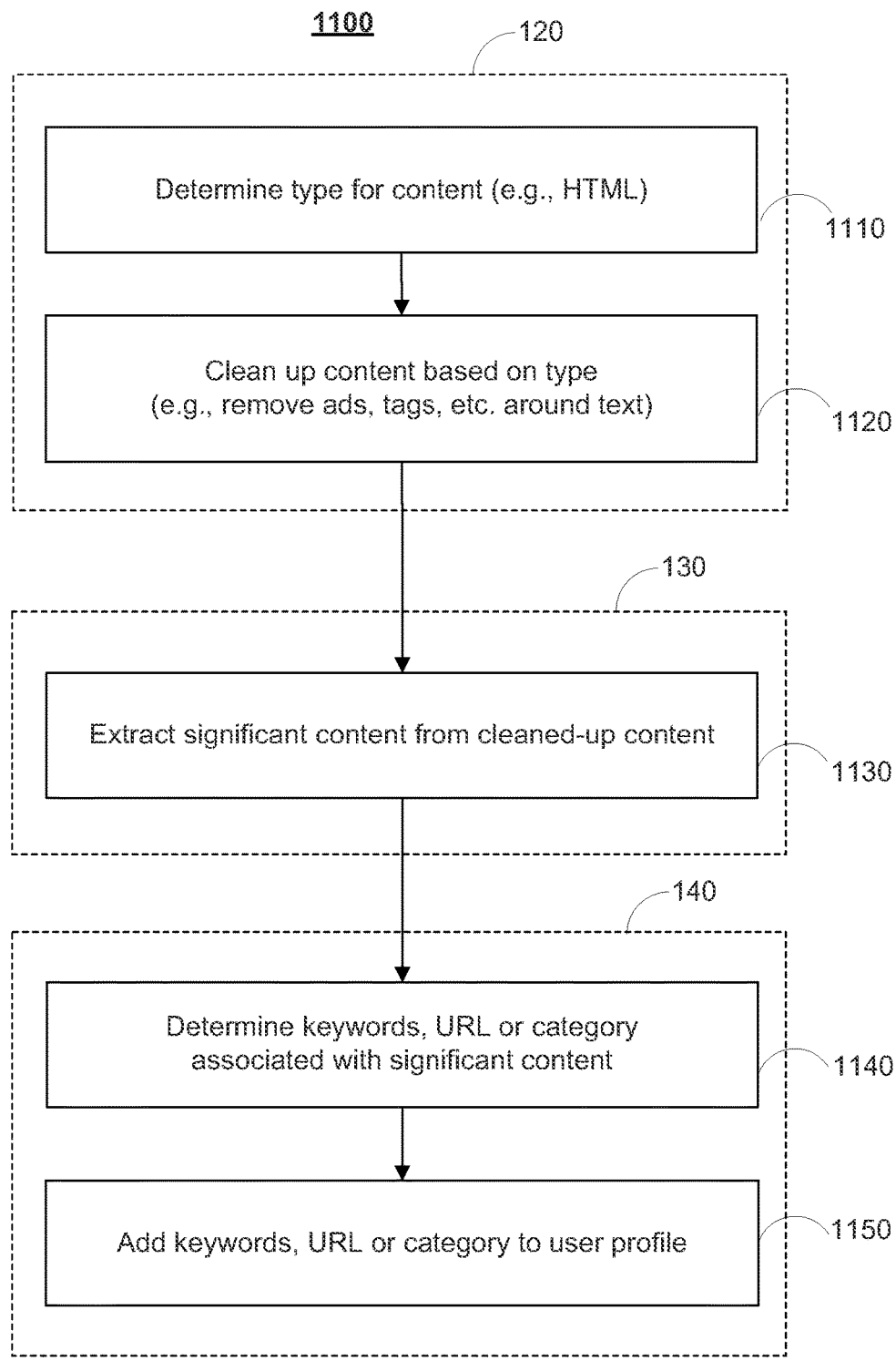
FIG. 11 is a flowchart of an exemplary process for updating a user profile based on content determined to be significant to a user.

FIG. 11 is an exemplary process 1100 for updating a user profile based on content determined to be significant to a user. Process 1100 may be performed, for example, by client 910 of either of systems 900A or 900B of FIG. 9A or 9B, respectively. Alternatively, host 930, or a combination of client 910 and host 930, may perform the operations of process 1100. Operations 1110-1120 may be a particular example of a process for performing operation 120 of FIG. 1, operation 1130 may be a particular example of performing operation 130 of FIG. 1 and operations 1140-1150 may be a particular example of a process for performing operation 140 of FIG. 1.

Upon determination of the content to which the user was most likely referring upon selection of the "I Like This" button, as described above, the client 910 determines a type for the content (1110). A type may include hypertext markup language (HTML), text, audio, video, email, instant message, spreadsheet or some combination thereof.

Based on the content type, the viewed or accessed content may be cleaned up (1120). Cleaning up the viewed or accessed content may include removing information, metadata and formatting that is extraneous to text that includes content actually viewed or accessed by the user. For example, tags and advertisements present around text in an HTML document (e.g., web page) may be removed. In another example, where the content is audio or video, cleaning up may includes performing speech-to-text, optical character recognition, visual pattern recognition, image analysis and metadata inspection techniques to determine the content actually viewed or accessed by the user.

The client 910 extracts significant content from the cleaned-up content, in a manner corresponding to that of process 400 of FIG. 4 described previously (1130). More particularly, the client 910 may perform process 400 to determine and extract significant content from the cleaned up content, rather than from the raw content identified prior to operations 1110-1120.

The client 910 determines keywords, a URL, a category or other indicia that is associated with the determined significant content (1140), as described above. The client 910 then adds the keywords, URL, category or other indicia to a user profile associated with the user who selected the "I Like This" button (1150). As described above, the updated user profile may be used to personalize the online experience of the user associated with the updated user profile by, for example, providing the user with personalized search results, updating a video or audio inbox associated with the user, targeting advertisements to the user or recommending content to the user.

Although this document focuses on determining significant content that is of interest to a user, as determined by selection of an "I Like This" button, other implementations may additionally, or alternatively, provide an "I Hate This" button for a user to indicate that particular content is not of interest to the user. The content that is not of interest may be analyzed in the manner described above, and future content provided to the user (e.g., search results or updates to a video inbox associated with the user) may not include content related to content associated with selection of the "I Hate This" button.

The described systems, methods, and techniques may be implemented in digital electronic circuitry, computer hardware, firmware, software, or in combinations of these elements. Apparatus embodying these techniques may include appropriate input and output devices, a computer processor, and a computer program product tangibly embodied in a machine-readable storage device for execution by a programmable processor. A process embodying these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be made.

What is claimed is:
1. A method comprising:
   presenting electronic content;
   providing a single-action selectable button to a user in a user interface that presents the electronic content, wherein selection by the user of the single-action selectable button indicates that the user is interested in at least a portion of the electronic content;
   detecting, by at least one processor, a selection by the user of the single-action selectable button;
   in response to the selection by the user of the single-action selectable button and without further user interaction:

analyzing the electronic content to determine multiple topics of interest from the electronic content based on context associated with the selection of the single-action selectable button;

selecting a topic of interest for the user from the determined multiple topics of interest based on the context associated with the selection of the single-action selectable button and information associated with the user; and updating, based on the selected topic of interest, a user profile associated with the user to reflect an association between the electronic content and the selected topic of interest; and providing, based on the updated user profile, additional content to the user.

2. The method of claim 1, wherein the single-action selectable button is independent of the electronic content.

3. The method of claim 1, further comprising identifying the additional content utilizing one or more attributes associated with the electronic content.

4. The method of claim 1, further comprising:
determining a recommended topic from the determined multiple topics of interest; and
recommending the recommended topic to the user for association with the electronic content.

5. The method of claim 4, wherein determining the recommended topic from the determined multiple topics of interest comprises determining the recommended topic based on previous topic selections made by the user.

6. The method of claim 1, further comprising determining the multiple topics of interest from the electronic content based on at least one of: the user profile associated with the user or one or more attributes associated with the electronic content.

7. The method of claim 1, wherein presenting the electronic content comprises presenting a web page.

8. The method of claim 7, wherein providing the single-action selectable button comprises providing the single-action selectable button within a window presenting the web page.

9. The method of claim 7, wherein providing the single-action selectable button comprises providing the single-action selectable button within a toolbar of a browser presenting the web page.

10. The method of claim 1, wherein the context associated with the selection of the single-action selectable button comprises viewable attributes of the electronic content within the user interface at a time of the selection of the single-action selectable button.

11. The method of claim 1, wherein the context associated with the selection of the single-action selectable button comprises media types from the electronic content displayed in the user interface at a time of the selection of the single-action selectable button.

12. The method of claim 1, wherein analyzing the electronic content to determine the multiple topics of interest from the electronic content based on the context associated with the selection of the single-action selectable button comprises:
extracting textual content from a portion of the electronic content that is displayed in the user interface at a time of the selection of the single-action selectable button; and
searching the textual content for the multiple topics of interest based on a frequency of terms within the textual content.

13. The method of claim 1, wherein the context associated with the selection of the single-action selectable button comprises cursor movements on the electronic content within a threshold time of the selection of the single-action selectable button.

14. The method of claim 1, further comprising analyzing metadata associated with the electronic content to determine the multiple topics of interest.

15. A system comprising:
at least one processor; and
at least one computer-readable medium storing instructions that, when executed by the at least one processor, cause the system to:
present electronic content;
provide a single-action selectable button to a user in a user interface that presents the electronic content, wherein selection by the user of the single-action selectable button indicates that the user is interested in at least a portion of the electronic content;
detect a selection by the user of the single-action selectable button;
in response to the selection by the user of the single-action selectable button and without further user interaction:
analyze the electronic content to determine multiple topics of interest from the electronic content based on context associated with the selection of the single-action selectable button;
select a topic of interest for the user from the determined multiple topics of interest based on the context associated with the selection of the single-action selectable button and information associated with the user; and
update, based on the selected topic of interest, a user profile associated with the user to reflect an association between the electronic content and the selected topic of interest; and
provide, based on the updated user profile, additional content to the user.

16. The system of claim 15, wherein the single-action selectable button is independent of the electronic content.

17. The system of claim 15, wherein the context associated with the selection of the single-action selectable button comprises viewable attributes of the electronic content within the user interface at the time of the selection of the single-action selectable button.

18. The system of claim 15, wherein the electronic content comprises a web page, and the single-action selectable button is provided within a window presenting the web page or a toolbar of a browser presenting the web page.

19. The system of claim 15, further comprising instructions that, when executed by the at least one processor, cause the system to:
determine a recommended topic from the determined multiple topics of interest; and
recommend the recommended topic to the user for association with the electronic content.

20. A non-transitory computer-readable medium storing instructions that, when executed by at least one processor, cause a computer system to:
present electronic content;
provide a single-action selectable button to a user in a user interface that presents the electronic content, wherein selection by the user of the single-action selectable button indicates that the user is interested in at least a portion of the electronic content;

detect a selection by the user of the single-action selectable button;

in response to the selection by the user of the single-action selectable button and without further user interaction:

analyze the electronic content to determine multiple topics of interest from the electronic content based on context associated with the selection of the single-action selectable button;

select a topic of interest for the user from the determined multiple topics of interest based on the context associated with the selection of the single-action selectable button and information associated with the user; and update, based on the selected topic of interest, a user profile associated with the user to reflect an association between the electronic content and the selected topic of interest; and provide, based on the updated user profile, additional content to the user.

* * * * *